(12) United States Patent
Le Gac et al.

(10) Patent No.: US 12,311,361 B2
(45) Date of Patent: May 27, 2025

(54) MICROFLUIDIC DEVICE FOR MECHANICALLY STIMULATING A MATERIAL

(71) Applicant: chrn on-chip biotechnologies B.V., Maastricht (NL)

(72) Inventors: Séverine Le Gac, Enschede (NL); Jeroen Christianus Hermanus Leijten, Enschede (NL); Carlo Alberto Paggi, Enschede (NL); Bastien Venzac, Enschede (NL)

(73) Assignee: chrn on-chip biotechnologies B.V., Maastricht (NL)

( * ) Notice: Subject to any disclaimer, the term of this patent is extended or adjusted under 35 U.S.C. 154(b) by 1030 days.

(21) Appl. No.: 17/287,279

(22) PCT Filed: Oct. 25, 2019

(86) PCT No.: PCT/EP2019/079291
§ 371 (c)(1),
(2) Date: Apr. 21, 2021

(87) PCT Pub. No.: WO2020/084148
PCT Pub. Date: Apr. 30, 2020

(65) Prior Publication Data
US 2021/0394179 A1    Dec. 23, 2021

(30) Foreign Application Priority Data

Oct. 26, 2018    (EP) ..................................... 18202998

(51) Int. Cl.
*B01L 3/00* (2006.01)

(52) U.S. Cl.
CPC ... *B01L 3/502707* (2013.01); *B01L 2300/069* (2013.01); *B01L 2300/14* (2013.01)

(58) Field of Classification Search
None
See application file for complete search history.

(56) References Cited

U.S. PATENT DOCUMENTS

| | | |
|---|---|---|
| 2002/0187560 A1 | 12/2002 | Pezzuto et al. |
| 2014/0134002 A1 | 5/2014 | Brettschneider et al. |
| 2017/0088807 A1 | 3/2017 | Kim |
| 2017/0327781 A1 | 11/2017 | Fernandez-Alcon et al. |

OTHER PUBLICATIONS

Wei Gu et al., "Computerized microfluidic cell culture using elastomeric channels and Braille displays," PNAS, vol. 101, No. 45, 2004, pp. 15861-15866.

*Primary Examiner* — Maris R Kessel
*Assistant Examiner* — Mickey Huang
(74) *Attorney, Agent, or Firm* — Occhiuti & Rohlicek LLP

(57) ABSTRACT

The invention provides a system comprising a microfluidic device for providing a mechanical stimulation to a material, the microfluidic device comprising a hosting chamber, a pressure array, and an elastic membrane, wherein the hosting chamber is configured for hosting the material, wherein the membrane is arranged between the pressure array and the hosting chamber, wherein the pressure array comprises a plurality of pressure chambers configured to independently provide a pressure to the membrane, wherein the pressure array comprises two adjacent pressure chambers sharing a chamber separator, wherein the membrane is configurable at a plurality of distances from the chamber separator based on pressures provided to the membrane by the two adjacent pressure chambers.

10 Claims, 7 Drawing Sheets

MICROFLUIDIC DEVICE FOR MECHANICALLY STIMULATING A MATERIAL

CROSS-REFERENCE TO RELATED APPLICATIONS

This application is a national phase under 35 U.S.C. 371 of International Application No. PCT/EP2019/079291 filed on Oct. 25, 2019, which claims priority to European Application No. 18202998.3 filed on Oct. 26, 2018, the contents of all of which are hereby incorporated by reference in their entireties.

FIELD OF THE INVENTION

The invention relates to a system comprising a microfluidic device as well as to the use of the system. The invention further relates to a method for manufacturing the system. The invention further relates to a method for providing a mechanical stimulation to a material with the system.

BACKGROUND OF THE INVENTION

Microfluidic devices are known in the art. Wei G U et al., in PNAS, vol. 101, no. 45, Nov. 9, 2004, pages 15861-15866 describes that computer-controlled microfluidics would advance many types of cellular assays and microscale tissue engineering studies wherever spatiotemporal changes in fluidics need to be defined. However, this goal has been elusive because of the limited availability of integrated, programmable pumps and valves. This paper describes how a refreshable Braille display, with its grid of 320 vertically moving pins, can power integrated pumps and valves through localized deformations of channel networks within elastic silicone rubber. The resulting computerized fluidic control is able to switch among: (i) rapid and efficient mixing between streams, (ii) multiple laminar flows with minimal mixing between streams, and (iii) segmented plug-flow of immiscible fluids within the same channel architecture. The same control method is used to precisely seed cells, compartmentalize them into distinct subpopulations through channel reconfiguration, and culture each cell subpopulation for up to 3 weeks under perfusion. These microscale cell cultures showed gradients of cellular behavior from C2C12 myoblasts along channel lengths, as well as differences in cell density of undifferentiated myoblasts and differentiation patterns, both programmable through different flow rates of serum containing media.

US2002187560A1 describes microfluidic devices for combining discrete fluid volumes that generally include channels for supplying different fluids toward a sample chamber and means for establishing fluid communication between the fluids within the chamber. Discrete fluid plugs are defined from larger fluid volumes before being combined. Certain embodiments utilize adjacent chambers or subchambers divided by a rupture region such as a frangible seal. Further embodiments utilize one or more deformable membranes and/or porous regions to direct fluid flow. Certain devices may be pneumatically or magnetically actuated.

US20140134002A1 describes a microfluidic peristaltic pump having an inflow channel, a first pumping chamber, which is operatively connected to the inflow channel by a first channel, and a first membrane. The pump also has a second pumping chamber, which is operatively connected to the inflow channel by a second channel, and a second membrane. A fluidic resistance of the first channel is different from a fluidic resistance of the second channel, and each channel is configured to realize a throttling function, such that the first and second membranes are deflected in a time sequence when a pressure is applied in the inflow channel, to realize a pumping function.

US2017088807A1 describes devices and methods for cell culturing. In particular embodiments, the cell culture devices include multi-channel devices with a non-linear flow path.

US2017327781 describes an organomimetic device including a microfluidic device that can be used to culture cells in its microfluidic channels. The organomimetic device can be part of dynamic system that can apply mechanical forces to the cells by modulating the microfluidic device and the flow of fluid through the microfluidic channels. The membrane in the organomimetic device can be modulated mechanically via pneumatic means and/or mechanical means. The organomimetic device can be manufactured by the fabrication of individual components separately, for example, as individual layers that can be subsequently laminated together.

SUMMARY OF THE INVENTION

Microfluidic devices (also "microfluidic platforms" or "microfluidic systems") comprise a broad range of devices related to the field of microfluidics. The field of microfluidics may deal with the behavior, control and manipulation of fluids, typically in small volumes, such as volumes on the order of $\mu l$, $nl$, $pl$, and $fl$. Microfluidic devices may be able to precisely control and manipulate fluids on a micrometer to sub-micrometer-size scale.

Microfluidic devices and microfluidic technologies in general, may be beneficial for the study of small systems due to a low consumption of chemicals, the miniaturization of the system, and the possibility to accurately control a broad range of parameters. For example, microfluidic devices may be able to control, for example, fluid pressures, flow rates, compression, fluid mixing, and/or temperature, especially control in a spatial and/or temporal manner.

Microfluidic devices known in the art may, however, be limited in their application of mechanical stimuli, such as with regards to shear stresses, compressions, moving pressure fronts, mechanically-induced perfusion, and stretching, etc. For example, the prior art may not describe a device configured to provide both a compression and a shear stress to a material.

Further, microfluidic devices may be configured to apply a liquid-based shear stress to a material by controlling a (laminar) flow of a fluid past the material, limiting the precise spatial and/or temporal control of the shear stress application on the material. In particular, liquid-based shear stress methods may be limited to providing a superficial shear stress. Such microfluidic devices for liquid-based shear stress may, for example, not be able to provide a complex succession of shear stresses having different directionalities.

Mechanical stimuli such as shear stresses, compressions, moving pressure fronts, and stretching, etc., may be especially relevant for microfluidic devices configured to represent a model system, such as a cellular model system, especially an organ-on-a-chip system, such as blood vessel model system, a gut model system, or a heart model system, a lung model system, an esophagus model system, or a cartilage model system. An organ-on-a-chip (system) may be a biomimetic system that incorporates micro engineering technologies such that it may recapitulate key elements present in a specific organ. Such systems may provide an alternative to animal testing, for example, with regards to drug screening. Such systems may further provide a disease model system, for example a cartilage model system may provide an osteoarthritis model system. An organ-on-a-chip may depend on a cell present in the system to experience stimuli similar to physiological stimuli, which may result in a more physiologically relevant cellular phenotype.

For example, a cartilage model system may require the simulation of the complex pressures experienced by the cartilage in an animal, such as in a human Cartilage is a specialized tissue arranged at the joint between bones with a structure that may reduce friction during motion (of the bones). This friction reduction function may depend on the distribution and arrangement of collagen (fibers) and proteoglycans in different cartilage layers (also: "zones"), as well as on specialized cells. These cells, including chondrocytes, may be (partially) responsible for the maintenance, development and repair of the cartilage. Movement (of the bones adjacent to the cartilage) may, depending on strain and frequency, influence the synthesis of proteins (including collagen) and proteoglycans by the cells. For example, dynamic compression with a strain (calculated as the reduction in cartilage dimension parallel to the compressive force during compression over the cartilage initial dimension) (e.g. selected from the range of 10-20%) may enhance the production of proteins and/or proteoglycans while a higher strain (e.g. selected from the range of 50-90%) may—in contrast—decrease the production of proteins and/or proteoglycans. Similarly, a (long) period of inactivity may lead to a degradation of the cartilage due to the absence of mechanical stimulation. Mechanical stimuli may further affect the uptake and/or secretion of (bio-)chemical compounds by the cells, such as the uptake of drugs. Hence, an improved ability to control mechanical stimuli in microfluidic devices may enable devising a more accurate cartilage model system.

It will be clear to the person skilled in the art that other model systems, such as cellular model systems, may similarly benefit from an improved ability to control mechanical stimuli in microfluidic devices.

Hence, it is an aspect of the invention to provide an alternative system, especially comprising a microfluidic device, which preferably further at least partly obviates one or more of above-described drawbacks. The present invention may have as object to overcome or ameliorate at least one of the disadvantages of the prior art, or to provide a useful alternative. The present invention relates to a microfluidic device for mechanically stimulating a material. The present invention further relates to a microfluidic device for (bio-)chemically stimulating a material.

Therefore, in a first aspect, the invention provides a system comprising a microfluidic device for providing a mechanical stimulation to a material, the microfluidic device comprising a hosting chamber, a pressure array, and an elastic membrane (also "membrane"), wherein the hosting chamber is configured for hosting the material, wherein the membrane is arranged between the pressure array and the hosting chamber, wherein the membrane may provide a fluid separation between the pressure array and the hosting chamber, wherein the pressure array comprises a plurality of pressure chambers configured to independently provide a pressure to the membrane, especially wherein the pressure may be selected from the range of −1500-10000 mbar, wherein the pressure array comprises two adjacent pressure chambers sharing a chamber separator, especially a chamber separator substantially perpendicular to the membrane, wherein the membrane is configurable at a plurality of distances from the chamber separator based on pressures provided to the membrane by the two (or more) adjacent pressure chambers. Especially, the membrane may be configurable between a first configuration and a second configuration, wherein the first configuration is closer to the chamber separator than the second configuration, and wherein the second configuration provides a fluid connection between the two adjacent pressure chambers (between the membrane and the chamber separator). Dependent upon the pressures in the two (or more) adjacent chambers the distance of the membrane relative to a chamber separator between two adjacent chambers may (essentially stepless) be controlled. In embodiments, the membrane may be configurable between a first configuration and a second configuration, wherein the first configuration is closer to the chamber separator than the second configuration, and wherein the second configuration provides a fluid connection between the two adjacent pressure chambers, especially a fluid connection between the membrane and the chamber separator, such as along the membrane and the chamber separator.

The phrase "perpendicular to the membrane" and similar phrases may especially refer to the membrane in the first configuration, especially in an abutment position. Further, this may especially refer to the plane of the membrane when configured in the abutment position. The openings of the chambers (toward the membrane) may form a plane. In the abutment position, the membrane may essentially be configured parallel to the plane.

The invention as described herein may facilitate precise control over providing mechanical stimuli to a material in the hosting chamber. The pressure chambers may be independently controlled to provide pressures to the elastic membrane, which may cause the membrane to deform, which may provide a mechanical stimuli, such as a compression or stretching, to the material. The pressures provided by the pressure chambers may be independently controlled at an ambient pressure, an overpressure, or an underpressure (by using a pressure device). As the fluid contact between the at least two adjacent pressure chambers depends on the configuration of the membrane, which depends on the pressures independently applied by the at least two adjacent pressure chambers, the microfluidic device may facilitate tight control over pressure regimes, such as controlling the sizes of pressure fronts, as well as controlling spatiotemporal pressure patterns.

As the two adjacent pressure chambers may be in fluid connection dependent on their pressures, the two adjacent pressure chambers may provide a shared pressure front (via the membrane) to the material. Hence, dependent on the pressure of the pressure chambers, the two adjacent pressure chambers may act as separate pressure points, especially compression points, (for example, when providing pressure of opposite sign), but may also act as a single shared pressure point, especially a compression point.

Herein, the terms "two adjacent chambers" or "two adjacent pressure chambers" and similar terms may thus in embodiments refer to a plurality of two or more adjacent chambers (in a one dimensional or two dimensional array).

During operation, the microfluidic device may, for example, provide a pressure wave by successively providing an overpressure in the two adjacent pressure chambers, especially wherein the pressure chambers surrounding a pressure front (the overpressure) provide an underpressure. Thereby, the microfluidic device may provide a shear stress to a material through spatiotemporal control of the pressures in the pressure chambers.

Microfluidic devices (also "microfluidic platforms" or "microfluidic systems") comprise a broad range of devices related to the field of microfluidics. The field of microfluidics may deal with the behavior, control and manipulation of fluids, typically in small volumes, such as volumes on the order of µl, nl, pl, and fl. In embodiments, the microfluidic device may comprise a microfluidic cell culture device. A microfluidic cell culture device may provide an analysis platform for the study of cells utilizing the microfluidics and/or microfluidics-based fluid manipulation technologies.

Microfluidic devices may be able to precisely control and manipulate fluids on a micrometer-size down to a sub-micrometer-size scale. Microfluidic devices may generally be made of polydimethylsiloxane (PDMS); a silicone-based polymer with elastic properties. PDMS may be broadly used because of its non-toxic and optically clear characteristics, accompanied by the handedness and the low cost. The channels or features present on the chip may be obtained through a process comprising soft-lithography and/or bonding.

One of the fields in which microfluidic platforms are used is biology. The advantages of microfluidic technologies to study cell behavior may include the low consumption of chemicals, the miniaturization of the system, and the possibility to control a broad range of parameters. The microfluidic devices may, for example, be configured to (i) direct chemical gradients, (ii) induce cell stress through fluid perfusion, and (iii) mimic specific microenvironments. Microfluidic devices may be configured to create 3D environments that simulate specific animal tissues, especially human tissues, or recapitulate physiological response of an entire organ. Such a microfluidic device may be known as an organ-on-a-chip (device).

The term "material" (also "matter") as used herein refers to any physical or corporeal substance, including solids, liquids, and gases. Hence, in embodiments, the material may comprise a solid, a liquid and/or a gas, especially a solid and a liquid, or especially a solid and a gas, or especially a liquid and a gas, more especially a solid and a liquid and a gas. Hence, In further embodiments, the material may comprise a (semi-)solid. In further embodiments, the material may comprise a liquid. In a yet further embodiment, the material may comprise a gas. The material may comprise a plurality of different materials, such as, for example, a solid and a liquid, as well as multiple different solids (and/or liquids and/or gases). In embodiments wherein the material comprises a plurality of different materials, the material may comprise a homogenous mixture of the different materials, but may also comprise an (advantageous) spatial arrangement of the different materials. For example, in a specific embodiment, the material may comprise a cell layer with a thin layer of liquid on top and air in the middle. Hence, the term "material" may also refer to a stack of layers of different materials. In embodiments, the term "material" may refer to biological compounds (as cells or extra-cellular matrix). A semi-solid material may be defined as a material having characteristics of both liquids and solids, e.g., a highly viscous material.

The hosting chamber (also: "holding chamber") is configured to host the material. In general, the hosting chamber may be in fluid connection to a hosting chamber reservoir. The hosting chamber reservoir may be configured to contain a fluid. The hosting chamber reservoir may provide a fluid connection between the hosting chamber and a location outside of the microfluidic device. In embodiments, the hosting chamber reservoir may be used, for example, to provide the material to the hosting chamber. In further embodiments, the hosting chamber reservoir may be used to pass the material through the hosting chamber. In a yet further embodiment, the hosting chamber reservoir may be used to provide a fluid connection between the material and a second material, such as a fluid comprising chemicals. The term "hosting chamber" may also refer to a part of a duct (or channel). The term "hosting chamber" may also refer to a plurality of different hosting chambers, which especially are configured to host different materials (see below).

As is clear to a person skilled in the art, chambers and channels in microfluidics devices may in general be in fluid connection to a chamber-specific or channel-specific reservoir. It will be clear to a person skilled in the art that although a particular reservoir may be described, such as the hosting chamber reservoir, the description may also apply to a different reservoir, such as a pressure chamber reservoir, as far as applicable.

The terms "channel" and "chamber" are used herein to refer to spaces in the microfluidic device. The term "channel" may especially refer to an elongated space, such as a tube, duct, pipe, or conduit, suitable for the transportation of a fluid. A channel may especially be elongated along one dimension with respect to the other dimensions. The term "chamber" may especially refer to a space wherein two dimensions are lengthened with respect to a third dimension, especially with respect to a thickness.

The term "pressure" herein especially refers to a gauge pressure, i.e., a pressure relative to the ambient air pressure. Hence, a phrase such as "a pressure chamber having a pressure of −100 mbar" indicates the pressure of the pressure chamber to be 100 mbar below the ambient air pressure, for example 100 mbar below the atmospheric pressure (1.01321 bar). In general, the ambient air pressure may be the atmospheric air pressure. However, the device may be operated in a pressurized environment, such as a in high-pressure room, wherein the ambient pressure is, for example, about twice the atmospheric pressure (2.02642 bar). The term "pressure" herein may refer both to positive and negative pressures, such as pressures selected from the range of −1500-10000 mbar (relative to the ambient pressure), especially from the range of −1000-7500 mbar, such as from the range of −500-5000 mbar, especially from the range of −350-2000 mbar. The term "positive pressure" may thus refer to a pressure selected from the range of 0-10000 mbar, such as from the range of 100-7500 mbar, such as from the range of 250-3000 mbar. Similarly, the term "negative pressure" may thus refer to a pressure selected from the range of −1500-0 mbar, such as from the range of −500-50 mbar, especially from the range of −350--100 mbar. It will be clear to the person skilled in the art that the absolute value of the negative pressure may not exceed the ambient pressure, i.e., if the ambient pressure is 1000 mbar, the negative pressure cannot be selected to be −1500 mbar, and may only be up to −1000 mbar. It will further be clear to the person skilled in the art that different pressures will be selected for different materials, i.e., the stiffer the material, the more pressure may be needed to reach a desired material deformation (and vice versa). For example, for a material having a stiffness comparable to PDMS the pressure may be selected from the range of −1500-3000 mbar (relative to the ambient pressure), especially from the range of −1000-2500 mbar, such as from the range of 500-2000 mbar, especially from the range of 350-1000 mbar. The term "positive pressure" may thus refer to a pressure selected from the range of 0-3000 mbar, such as from the range of 100-2500 mbar, such as from the range of 500-2000 mbar, especially from the range of 1000-2000.

The pressure chambers are configured to independently provide a pressure to the membrane. Specifically, each pressure chamber is configured to (independently) host a fluid for providing a fluid pressure (to the membrane), i.e. a pressure provided by the fluid. The pressure in a pressure chamber may be controlled via a respective pressure chamber reservoir. In general, each pressure chamber may be in fluid connection to a different pressure chamber reservoir. However, in embodiments, multiple pressure chambers may also be in fluid connection to a single pressure chamber reservoir. The phrase "to independently provide a pressure" refers to the microfluidic device facilitating providing different (fluid) pressures to different pressure chambers, especially via different pressure chamber reservoirs. It will be clear to a person skilled in the art that, during operation, two pressure chambers independently pressurized may come into fluid contact (via an opening between the membrane and a chamber separator between two pressure chambers), which may result in a flow of fluid from a high-pressure chamber to a low-pressure chamber, which may provide some (temporary) bidirectional influences between the pressures in the pressure chambers. The fluid for providing a (fluid) pressure may comprise a liquid and/or a gas, especially a gas. The phrase "configured to independently provide a pressure" and similar phrases may also indicate that the pressure chambers are configured to be able to independently provide a pressure to the membrane. Further, the fact that the pressure chambers are able to independently provide a pressure to the membrane does not necessarily imply that in each operation mode the pressure is independently provided to the membrane. Further, the phrase "the pressure chambers are configured to be able to independently provide a pressure" and similar phrases does not exclude that in embodiments adjacent pressure chamber may provide—during a time period during operation—essentially the same pressure to the membrane.

During operation, each pressure chamber may—in embodiments—be provided with a pressure independently selected from the range of −1500-10000 mbar, especially from the range of −1000-7500 mbar, such as from the range of −500-5000 mbar, especially from the range of −350-2000 mbar.

Two adjacent pressure chambers sharing a chamber separator, especially a chamber separator substantially perpendicular to the membrane. As indicated above, especially the membrane is configured moveable between a first configuration and a second configuration relative to the chamber separator based on pressures provided to the membrane by the two adjacent pressure chambers, may herein also be referred to as a "pressure set", i.e., a pressure set comprises two adjacent pressure chambers sharing a chamber separator, especially a chamber separator substantially perpendicular to the membrane, wherein the membrane is configured moveable between a first configuration and a second configuration relative to the chamber separator based on pressures provided to the membrane by the two adjacent pressure chambers.

The first configuration of the membrane may be less distant from the chamber separator than the second configuration of the membrane. Especially, the first configuration may be an abutment position of the membrane relative to the chamber separator, i.e., the membrane touches the chamber separator. Especially, with the membrane in the abutment position, the two adjacent pressure chambers may be in fluid separation. In particular, with the membrane in the abutment position, the two adjacent pressure chambers may be in fluid separation along the membrane i.e., the two adjacent pressure chambers are not in fluid connection between the membrane and the chamber separator.

The second configuration of the membrane is, thus, more distant from the chamber separator than the first configuration of the membrane. The second configuration may herein also be referred to as "remote position".

In embodiments, the membrane is configured moveable between an abutment position and a remote position relative to the chamber separator based on pressures provided to the membrane by the two adjacent pressure chambers, wherein the abutment position provides a fluid separation of the two adjacent pressure chambers, and wherein the remote position provides a fluid connection between the two adjacent pressure chambers.

A pressure chamber may be comprised in multiple pressure sets. For example, In embodiments comprising a row of five pressure chambers, the first and last pressure chambers in the row may both be comprised in a single pressure set, whereas the three central pressure chambers may each be part of two pressure sets. In further embodiments, two adjacent pressure chambers in the row may not be part of a pressure set.

Two or more pressure chambers may provide a pressure to the same (part) of the membrane. For instance, in embodiments the membrane may configured over two or more pressure chambers, such that e.g. at the second configuration of the membrane there is a fluid connection between all two or more pressure chambers and the membrane may be configured a convex membrane (convex relative to the two or more pressure chambers), whereas in the first configuration, especially in an abutment configuration, the two or more pressure chamber as closed by the membrane.

The chamber separator separates two adjacent pressure chambers. The chamber separator may be regarded as a wall between two adjacent pressure chambers. The chamber separator is arranged such that the elastic membrane may act as a valve between the two adjacent pressure chambers of the pressure set, i.e., during operation the membrane may be in a remote position from the chamber separator such that the two adjacent pressure chambers are in fluid connection, or the membrane may abut the chamber separator such that the two adjacent pressure chambers are in fluid separation (also: "closed fluid connection").

The chamber separator may have any shape suitable to separate two adjacent pressure chambers. The shape may, for example, depend on the shape of the two adjacent pressure chambers. In embodiments, the shape may approximate a plane, i.e., the chamber separator may be a straight wall. In further embodiments, the chamber separator may have a V-shape, especially wherein the tip of the V-shape is arranged nearest to the membrane. In further embodiments, the chamber separator may have a T-shape. In a yet further embodiment, the chamber separator may have an arc-shape.

In a further embodiment, the chamber separator may be arranged (substantially) perpendicular to the membrane, i.e., an axis of the chamber separator (arranged between the adjacent pressure chambers) may be arranged (substantially) perpendicular to the membrane. In further embodiments, the chamber separator, or part thereof, may be arranged at angle relative to the membrane, especially an angle selected from the range of 30°-90°.

Hence, a pressure chamber may be defined by a wall. The wall, or at least part thereof may be configured as chamber separator with an adjacent pressure chamber. The pressure chamber may include at one side an opening that may be configured in fluid connection with a pressure device. Further, the pressure chamber may at another side have an opening facing the membrane. Hence, the pressure chamber may in embodiments be defined by an enclosing wall with two openings. These two openings may be configured at a distance about equal to a width of the pressure chamber.

A pressure array comprises a plurality of pressure chambers. The pressure array is arranged adjacent to the elastic membrane such that the plurality of pressure chambers may provide a pressure to the membrane, especially a plurality of (different) pressures, respectively. In embodiments, the pressure array comprises a row of pressure chambers, especially a row arranged along the membrane. In further embodiments, the pressure array comprises a grid of pressure chambers, especially a grid arranged along the membrane. The term "grid of pressure chambers" refers to an arrangement of pressure chambers along multiple dimensions (such as 1D or 2D), especially an arrangement along (part of) the surface of the elastic membrane, such as a tessellating arrangement. In embodiments, the grid may approximate a grid of squares. In further embodiments, the grid may approximate a grid of hexagons. In further embodiments, the grid may have an irregular shape, i.e., the grid cells may vary in shape and/or size. Hence, herein the term array may especially refer to a 1D array, but in other embodiments may refer to a 2D array. Both types of embodiments are covered by the term "grid".

In embodiments, the pressure array may comprise a plurality of pressure sets, especially at least two pressure sets. In general, each pressure chamber comprised in a pressure array may be comprised in at least one pressure set.

The term "pressure array" may also refer to a plurality of different pressure arrays, especially a plurality of different pressure arrays arranged adjacent to respective different elastic membranes. Hence, in embodiments, the microfluidic device may comprise a plurality of (spatially separated) pressure arrays.

The elastic membrane (also "membrane") is arranged between the pressure array and the hosting chamber. The elastic membrane may provide a fluid separation between the pressure array and the hosting chamber. The elastic membrane is arranged such that it may be (reversibly) deformed dependent on the pressure(s) of the pressure chambers of the pressure array. Especially, the elastic membrane is further arranged such that a deformation of the elastic membrane may provide a mechanical stimulation to a material in the hosting chamber. In general, the deformation of the elastic membrane is reversible, i.e., the deformation of the elastic membrane at any moment may be a function of the current environment of the elastic membrane and may be substantially independent of past deformations of the elastic membrane.

The term "elastic" as in "elastic membrane" refers to the property of being capable of returning to an original shape after being deformed, especially after being stretched, compressed, and/or expanded.

In embodiments, the elastic membrane may be arranged directly adjacent to the hosting chamber. In further embodiments, the elastic membrane and the hosting chamber may be separated by another element, especially by a first channel. In such embodiment, a deformation of the elastic membrane may directly and/or indirectly provide a mechanical stimulus to the material in the hosting chamber, especially via providing a mechanical stimulus to the other element.

In embodiments, the elastic membrane is configured moveable between an abutment position and a remote position relative to a chamber separator, especially based on pressures provided to the elastic membrane by the two pressure chambers sharing the respective chamber separator. For example, if both pressure chambers provide a high pressure, the elastic membrane may be deformed towards the remote position, i.e., the membrane may be pushed away from the chamber separator. However, if, for example, the two adjacent chambers provide a low pressure, especially a high and negative gauge pressure, the elastic membrane may be deformed towards the abutment position, i.e., the membrane may be sucked towards the chamber separator(s). The two (or more) adjacent pressure chambers may provide different pressures to the membrane, such as one of the two adjacent pressure chambers providing a positive pressure and the other chamber providing a negative pressure. In such a scenario, the membrane may be deformed towards the abutment position, but may also be deformed towards the remote position, dependent on the applied pressures.

In further embodiments, the membrane may be fixed to the pressure array, especially in between two adjacent pressure chambers (not comprised in a shared pressure set). For example, a pressure array comprising a row of four pressure chambers may be fixed to the membrane between the second and the third of the pressure chambers. Especially, in such embodiment, a first pressure set may comprise the first and the second pressure chamber, and a second pressure set may comprise the third and the fourth pressure chamber. However, in other embodiments the membrane may be fixed to the pressure array only at the ends of the array, thus configured over all four pressure chambers (or pressure chamber openings).

It will be clear to a person skilled in the art that the membrane deformation depends on all environmental pressures experienced by the membrane. Hence, the membrane deformation with respect to a chamber separator may depend on pressures from the two adjacent pressure chambers, but may also depend on pressures from other pressure chambers (of the same or a different pressure array), but may further also depend on pressures experienced from the material in the hosting chamber, as well as from a housing of the microfluidic device, as well as from a material surrounding the microfluidic device.

In embodiments, the elastic membrane may, together with the chamber separator, be regarded as a valve between the two (or more) adjacent pressure chambers. With the membrane in the remote position, the elastic membrane may provide a fluid connection to the two adjacent pressure chambers (at the chamber separator). With the membrane in the abutment position, the membrane may provide a fluid separation to the two adjacent pressure chambers (at the chamber separator). As the membrane can be moved between the abutment position and the remote position, the distance between the membrane and the chamber separator may be varied, thereby providing control over the extent of fluid connection. The fluid connection may be decreased to such an extent, by applying to at least one chamber a negative pressure, that the fluid connection is not significant anymore (relative to the respective pressures in the adjacent chambers); hence, the adjacent chambers may—in embodiments—be controlled essentially independently.

The invention may be primarily described herein in relation to a cartilage model system to illustrate advantages of the system according to the invention. The invention is, however, not limited to such application and further relates to other (cellular) model systems, as well as to other microfluidics applications such as a peristaltic pump, and/or a model system to study a fracture phenomenon in a colloidal solid. It will be clear to the person skilled in the art that the invention as described herein may be suitable for many more applications, such as material science applications with regards to studying a material under stress.

In embodiments, the microfluidic device may further comprise a first channel arranged between the membrane and the hosting chamber, wherein the first channel is configured to host a first fluid, especially wherein the first fluid comprises a viscous liquid. The first channel may be in fluid connection to the hosting chamber. The first fluid may be in fluid connection to the material in the hosting chamber. The first fluid may provide several functions, in particular with regards to a cellular model system, such as for example: (i) friction reduction (as a grease), (ii) shock absorption (as a dilatant), (iii) supply of (bio-)chemicals, such as nutrients or drugs, and (iv) waste removal.

In further embodiments, the first channel may, for example, be configured as a model of a synovial fluid compartment in a cartilage system.

In embodiments, the microfluidic device may further comprise a perfusion channel, wherein the perfusion channel is arranged in fluid contact with the hosting chamber, especially wherein the perfusion channel is configured to host a perfusion fluid, wherein the perfusion fluid may be in fluid contact with the material in the hosting chamber. In general, the perfusion channel is arranged spatially separated from a pressure array, i.e., the hosting chamber is (at least partially) arranged between the perfusion channel and the pressure array.

The perfusion fluid may be particularly suitable to provide (bio-)chemicals to the (material in the) hosting chamber, and/or to remove waste (compounds) from the (material in the) hosting chamber. In further embodiments, the perfusion channel may, for example, be configured as a model of a blood vessel in a cartilage system.

In further embodiments, a first compound may (be allowed to) diffuse from the perfusion channel to the material in the hosting chamber, which may provide a concentration gradient of the first compound along the width in the hosting chamber. Herein, the term "first compound" may also refer to a plurality of different first compounds.

In further embodiments, the microfluidic device further comprises a porous barrier arranged between the hosting chamber and the perfusion channel. In further embodiments, the porous barrier is configured to allow the perfusion fluid to move through the porous barrier (into the hosting chamber), while preventing the material arranged in the hosting chamber to move through the porous barrier (into the perfusion channel).

In further embodiments, the porous barrier may comprise pores having a pore size selected from the range of 10 nm-1 mm.

In further embodiments, the porous barrier comprises a row of solid pillars being separated by a distance of 10 nm-1 mm. The pillars may, for example, have a size selected from the range of $50 \times 50 \times T_d$ $\mu m^3$-$250 \times 250 \times T_d$ $\mu m^3$, such as $100 \times 150 \times T_d$ $\mu m^3$, wherein $T_d$ is the thickness/height of the microfluidic device.

In further embodiments, the porous barrier may be selected from the group comprising a (stiff) hydrogel, a porous solid, a porous filament, an array of pillars, a porous polymer wall, and a porous ceramic wall. In further embodiments, the porous barrier may be configured to reduce, especially prevent, a shear stress on the material due to the direct flow of the perfusion fluid. In further embodiments, the porous barrier may provide a support for the material in the hosting chamber, especially as a positive pressure is applied to the membrane by a pressure chamber. In further embodiments, the porous barrier may be configured to prevent a liquid precursor material to move through the porous barrier from the hosting chamber.

In embodiments, the pressure array may comprise pressure chambers having different sizes, especially different volumes.

In further embodiments, the pressure array may comprise pressure chambers having different shapes, especially different cross-sectional shapes perpendicular to the membrane, such as different cross-sectional shapes near the membrane. For example, the cross-sectional shape of a first pressure chamber (near the membrane) may approximate a square, while the cross-sectional shape of a second pressure chamber (near the membrane) may approximate a hexagon, while the cross-sectional shape of a third pressure chamber (near the membrane) may approximate a triangle.

Hence, in embodiments the pressure array may comprise two or more subsets of types of pressure chambers, wherein the dimensions of the pressure chambers are the same in the subsets but differ relative to other subsets.

It will be clear to a person skilled in the art that differently sized and/or shaped pressure chambers may be beneficially used to control the mechanical stimuli that can be provided to the material in the hosting chamber.

In embodiments, the system may comprise or be functionally coupled to a pressure device configured for independently controlling the pressure in the plurality of pressure chambers. The pressure device may be selected from the group comprising a pressure pump, a vacuum pump, and a combined pressure and vacuum pump. In general, during operation, each pressure chamber may be connected to one or more pressure devices such that the pressure in the pressure chamber may be adjustable to a positive pressure as well as to a negative pressure.

In further embodiments, the system may comprise or be functionally coupled to a control system configured to control the pressure device.

In further embodiments, the system may comprise or be functionally coupled to an analysis system configured to analyze the microfluidic device, especially the hosting chamber, such as especially the material in the hosting chamber. In a yet further embodiment, the analysis system may be functionally coupled to the control system, especially wherein the analysis system provides an analysis signal to the control system. In embodiments, the control system may control the pressure device dependent on the analysis signal.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The system, or apparatus, or device may execute an action in a "mode" or "operation mode" or "mode of operation" or "control mode". Likewise, in a method an action or stage, or step may be executed in a "mode" or "operation mode" or "mode of operation" or "control mode". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

In a yet further embodiment, the analysis system may comprise an imaging system.

The shape of a pressure chamber may comprise any three-dimensional shape. Practically, the shape of a pressure chamber may have at least one flat surface configured towards the membrane. In further embodiments, the shape of a pressure chamber may approximate the shape of a (right) prism, such as a (right) triangular prism, a (right) tetragonal prism, or a (right) hexagonal prism.

In embodiments, the shape of a pressure chamber may be substantially uniform along a height dimension of the pressure chamber, i.e. the pressure chamber may have a (substantially) identical cross-section along a height dimension ("thickness").

In embodiments, the sizes of the pressure chambers may be independently selected from the range of $100\times100\times10$ $\mu m^3$-$2000\times2000\times300$ $\mu m^3$, such as $100\times2000\times200$ $\mu m^3$ or $1000\times1000\times200$ $\mu m^3$. Hence, as indicated above different pressure chambers may have different sizes. In other embodiments, the sizes of all pressure chambers are essentially identical. Hence, in embodiments the width of the pressure chamber(s) may be selected from the range of 100-2000 $\mu m$; in embodiments the length of the pressure chamber(s) may be selected from the range of 100-2000 $\mu m$; and in embodiments the thickness (or height) of the pressure chamber(s) may be selected from the range of 10-300 $\mu m$. Further, as indicated above, different pressure chambers may have different dimensions. In other embodiments, essentially all pressure chambers have essentially identical dimensions. Further, in embodiments one or more dimensions may vary over one or more of the other dimensions. For instance, the length may vary over the width.

In further embodiments, the chamber separator between two adjacent pressure chambers may have a width selected from the range of 10-200 $\mu m$ shorter than the width of (one of) the respective pressure chambers. Hence, with the membrane in a neutral position (the chambers having a pressure equal to the ambient air pressure), the two adjacent pressure chambers may have a fluid connection, with the membrane at a non-zero distance from the chamber separator over the width of 10-200 $\mu m$.

In embodiments, the optional first channel may have a channel width selected from the range 10-300 $\mu m$.

In embodiments, the hosting chamber may have a width (perpendicular to the membrane) selected from the range of 500-3000 $\mu m$.

In embodiments, the optional perfusion channel may have a channel width selected from the range of 200-1000 $\mu m$.

In embodiments, the membrane may be configured moveable relative to a chamber separator over a movement range selected from the range of up to about 500 $\mu m$ (distance from the chamber separator), such as from the range of up to 300 $\mu m$. Especially, the minimum movement range is up to at least 1 $\mu m$, such as up to at least 5 $\mu m$, like up to at least 10 $\mu m$. For example, if the membrane is moveable relative to the chamber separator over a movement range of 100 $\mu m$, the membrane may be moveable between a first configuration and a second configuration, wherein the first configuration and the second configuration are 100 $\mu m$ apart. The term "first configuration" is used herein to indicate the configuration of the membrane closer to a chamber separator. In embodiments, the first configuration may be an abutment position relative to the chamber separator, i.e., the distance between the chamber separator and the membrane in the first configuration may be (approximately) 0 $\mu m$.

The movability of the membrane is especially due to its elasticity.

In further embodiments wherein the microfluidic device comprises a plurality of pressure sets, especially wherein a pressure array comprises a plurality of pressure sets, the movement range of the membrane relative to different chamber separators may be different, especially the movement range relative to different chamber separators may be the same. Similarly, the distance of the first configuration of the membrane to different chamber separators may be different, especially the distance of the first configuration of the membrane to different chamber separators may be the same. Hence, In further embodiments, the first configuration of the membrane with respect to a first chamber separator may be arranged at a distance of 10 $\mu m$ from the chamber separator, whereas the first configuration of the membrane with respect to a second chamber separator may be arranged to abut the chamber separator (at an abutment position).

The invention also provides the microfluidic device per se.

The microfluidic device may in embodiments be configured as a plate-like device. In embodiments, the microfluidic device may be a monolithic body. In embodiments, the array of pressure chambers may be configured parallel to the two main faces of the plate-like device. The two main faces may define the height (also: "thickness") of the plate-like device. Hence, the chamber separators may in embodiments be configured perpendicular to two main faces.

In a second aspect, the invention further provides a method for manufacturing the system according to the invention. The method comprises:—a manufacturing stage comprising applying one or more of photolithography, deposition, 3D-printing, mechanical milling, laser ablation, 2-photon lithography, electro-deposition, wet etching, and dry etching, bonding, injection molding, embossing and soft lithography, to provide the microfluidic device.

In embodiments, the manufacturing stage may further comprise providing the microfluidic device from a microfluidic device material having desired properties. For example, the microfluidic device material may be one or more of flexible (non-brittle), elastic, and (optically) transparent, such as (optically) clear), non-toxic, non-inflammable, and low-cost. The microfluidic device material may be selected from the group comprising silicon, glass, a thermoplastic material, such as PDMS and Excoflex, a thermoset material, such as SU-8, and any other elastomeric material.

The microfluidic device may thus be made of microfluidic device material. In further embodiments, the membrane (material) may (also) be provided from the microfluidic device material, i.e., the membrane (material) may comprise the (same material as the) microfluidic device material. However, in further embodiments, the membrane may be provided from a membrane material different from the microfluidic device material. The membrane material may in embodiments be one or more of flexible (non-brittle), elastic, and (optically) transparent, such as (optically) clear), non-toxic, non-inflammable, and low-cost, especially flexible and elastic. The membrane material may further be selected to not undergo plastic deformation in the range of deformation the membrane will be subjected to during operation of the device. The membrane material may be selected from the group comprising thermoplastic materials, such as PDMS and Excoflex, elastic photoresists for 3D-printing, NOA (Norland Optical Adhesive), and Teflon thin membranes.

In further embodiments, the manufacturing stage may further comprise providing the microfluidic device from an elastic material, especially from an elastic material selected from the group comprising styrenic block copolymers, such as TPS (TPE-s), thermoplastic polyolefin elastomers, such as TPO (TPE-o), thermoplastic vulcanizates, such as TPV (TPE-v or TPV), thermoplastic polyurethanes, such as TPU, thermoplastic copolyesters, such as TPC (TPE-E), thermoplastic polyamides, such as TPA (TPE-A), non-classified thermoplastic elastomers, such as TPZ, (other) silicone materials, such as Ecoflex, polyethylene terephthalate (PET), Teflon-like membranes, such as FEP and PTI-B, and NOA. The elastic material may provide the benefit that the chambers in the microfluidic device are reversibly deformable as a function of the pressures on the chambers, especially as a function of the pressures provided by the pressure chambers.

In further embodiments, the manufacturing stage may further comprise providing the microfluidic device from a(n optically) transparent material, especially from a(n optically) transparent material selected from the group comprising glass, thermoplastic materials, PDMS, NOA, PEGDA, PMMA, COC, PS, PC, PET, PE, and PU. The optically transparent material may provide the benefit that the contents of the microfluidic device, especially the material in the hosting chamber, can be visually monitored during operation of the microfluidic device. For instance, this may be useful for (analysis) methods such as microscopic imaging. The invention also allows a laterally arranged system. This may be useful for e.g. optical inspection, which may be easier with a system according to the invention than with a system which provides pressure from the top.

In further embodiments, the manufacturing stage may further comprise embedding a moveable fiber (also: "actionable fiber") in the microfluidic device, especially in between the membrane and the hosting chamber and, more especially at least partially in physical contact with the membrane. The moveable fiber may facilitate providing a fluid precursor material to a first chamber, such as the hosting chamber, and hardening, such as gelating (causing gelification), the fluid precursor material to provide the material in the first chamber while the moveable fiber blocks access of the fluid precursor material to a second chamber (or channel), such as the first channel, otherwise in fluid connection to the first chamber. Hence, the moveable fiber may enable providing different materials, such as different hydrogels, with different compositions into the microfluidic device, especially providing different materials in a layered manner. The presence of different materials in the microfluidic device may be beneficial for specific model systems, for example to simulate the successive cellular layers present in cartilage.

The use of a moveable fiber to sequentially provide materials to a microfluidic device is further described in US20180193833, which is hereby incorporated herein by reference.

In further embodiments, the method may further comprise:—a material providing stage comprising providing a fluid precursor material, especially a liquid precursor material, to the hosting chamber, and hardening the fluid precursor material to form the material. The hardening of the fluid precursor material may comprise one or more of, polymerizing, heating, denaturing, irradiating, such as with radiation and/or light, especially UV-light, gelification, physical-cross-linking, such as (reversible) hardening through ionic interactions, and enzymatic cross-linking. It will be clear to the person skilled in the art which hardening methods are suitable for a specific fluid precursor material.

In further embodiments, the material providing stage may further comprise removing the moveable fiber after hardening of the fluid precursor material to provide the first channel.

In a further aspect, the invention further provides a method for providing a mechanical stimulation to a material with the system according to the invention, wherein the material is arranged in the hosting chamber, wherein the microfluidic device comprises or is functionally coupled to a pressure device configured for independently controlling the pressure in the plurality of pressure chambers, wherein the method comprises:—a pressure stage comprising providing a pressure on the material with at least part of the membrane, especially by providing a positive pressure to a pressure chamber, or especially by providing a negative pressure to a pressure chamber.

In embodiments, the pressure stage may comprise the steps: (i) providing a positive pressure on the membrane with a first pressure chamber of a pressure set, especially while providing a negative pressure on the membrane with a second pressure chamber of the pressure set, (ii) providing a positive pressure on the membrane with a second pressure chamber of the pressure set, especially while maintaining the positive pressure on the membrane provided by the first pressure chamber; and (iii) releasing the positive pressure on the membrane provided by the first pressure chamber, and especially providing a negative pressure on the membrane with the first pressure chamber. By maintaining the pressure on the membrane provided by the first pressure chamber while providing a positive pressure with the second pressure chamber, the pressure chambers of the pressure set may provide a shared pressure front to the membrane, i.e., the membrane may bulge as if the two adjacent pressure chambers of the pressure set were one big pressure chamber. Hence, by successively applying positive pressures along the pressure chambers of the pressure set, the pressure set may provide a moving pressure front to the material, starting from the membrane at the first pressure chamber, to the membrane at both the first pressure chamber and the second pressure chamber, to the membrane at the second pressure chamber. In further embodiments, the second pressure chamber is part of a second pressure set, and the pressure stage further comprises successively applying pressures to the pressure chambers of the second pressure set. It will be clear to a person skilled in the art that the method can be extended to a pressure array comprising a plurality of successively arranged pressure sets to provide a moving pressure front, especially a waveform, to a material.

In further embodiments, the system comprises an organ model system, especially a gut model system, or especially a blood vessel model system, configured to simulate peristalsis by providing a moving pressure front, especially a waveform, to the material. Especially, the system may be configured to repeatedly provide a moving pressure front to the material with a (predetermined) frequency.

It will be clear to a person skilled in the art that many other spatial and/or temporal pressuring patterns may be devised within the scope of the invention. For example, (a subset of) the pressure chambers in a pressure array may be successively and repeated activated, especially to provide a positive pressure. In embodiments, the pressure array comprises three (adjacently arranged) pressure chambers which may be successively and repeatedly activated, such as in a pattern of successive states Abc-aBc-abC-Abc-aBc-abC-..., wherein "A" ("a") indicates a positive (negative) pressure in a first pressure chamber, "B" ("b") a positive (negative) pressure in a second pressure chamber, and "C" ("c") a positive (negative) pressure in a third pressure chamber. Similarly, a repeating pattern Abc-ABc-aBc-aBC-abC-abc-Abc-... may be applied. Further, for example, In embodiments wherein the pressure array comprises four pressure chambers, a repeating pattern such as AbCd-aBcD-AbCd-... may be applied.

It will further be clear to a person skilled in the art that the pressures of the different pressure chambers are independently selected, hence, in aforementioned pattern state AbCd, the first and third pressure chambers each have an independently selected positive pressure, especially from the range of 0-3000 mbar. Hence, the first pressure chamber may, for example, have a pressure of 100 mbar while the second pressure chamber has a pressure of 1500 mbar.

In further embodiments, the method further comprises:— an exposure stage comprising exposing at least part of the material to a (bio-)chemical compound, such as a nutrient or drug or any other soluble factor, for example a growth factor and/or a (cell fate or growth) differentiation factor, especially to provide a (bio-)chemical stimulus to the material.

In further embodiments, the method further comprises:— an analysis stage comprising analyzing at least part of the material. For example, the analysis stage may comprise monitoring the material before, during, and/or after the pressure stage, especially to determine how the material is affected by the pressure stage. Similarly, the analysis stage may comprise monitoring the material before, during and/or after the exposure stage, especially to determine how the material is affected by the exposure stage, such as especially by both the pressure stage and the exposure stage.

In further embodiments, the method comprises providing a mechanical stimulus to a cell to trigger and/or analyze cell differentiation. In a yet further embodiment, the method further comprises providing a (bio-)chemical stimulus to the cell.

Hence, in further embodiments, the pressure stage comprises sequentially providing a pressure, especially a positive pressure, on the membrane with adjacently arranged pressure chambers to provide a pressure wave to the membrane along the pressure chambers. Especially, the pressure chambers may provide a negative pressure to the membrane before and after their turn in the sequentially providing a positive pressure.

In embodiments, the material may comprise one or more of a thermofusible material, a thermoplastic material, a resin, an elastomer, a glass, a thermopolymerizable material, a photo polymerizable material, a chemically cross linkable material, a hot melt, a gel, an adhesive, a vitrimer, or a hydrogel.

In further embodiments, the material may comprise a hydrogel, especially a hydrogel selected from the group comprising agarose, collagen, agar gum, polylactic acid, polyglutamic acid, alginate, gelatin, (enzymatically) crosslinked Dextrain-tyramine, and Matrigel™. The pressure stage especially comprises providing a pressure on the hydrogel with at least part of the membrane.

In further embodiments, the material may comprise a cell, especially a live cell. Especially, the hydrogel may comprise a cell. The cell may comprise a bacterial cell. The cell may comprise an archaeal cell. The cell may comprise a eukaryotic cell, especially a plant cell or an animal cell, such as a human cell. In a specific embodiment, the cell may comprise a animal cell, especially a human cell, selected from the group comprising a blood vessel cell, a gut cell, a heart cell, a lung cell, or a cartilage cell, such as, for example, a white blood cell, a red blood cell, an epithelial cell, a (cardiac) muscle cell, an alveolar macrophage, an osteocyte and a chondrocyte. In a specific embodiment, the cell may comprise a cancer cell. In a further specific embodiment, the cell may comprise a stem cell, especially an induced pluripotent stem cell, or especially a mesenchymal stem cell. The term "a (live) cell" further refers to a plurality of (live) cells, especially a cell suspension. In further embodiments, the material may comprise a plurality of (different) cells. In further embodiments, the material comprises a cell suspension, especially a cell suspension having a cell density selected from the range of $10^5$-$10^8$ cells/ml, such as from the range of $10^6$-$10^7$ cells/ml, especially from the range of $2*10^6$-$4*10^6$. Hence, the phrase "the material may comprise a cell" and similar phrases may also indicate that the material comprises a plurality of (different types of) cells. The cancer cell(s) may include one or more of a breast cancer cell, a prostate cancer cell, a pancreatic cancer cell, a brain cancer cell, etc.

In a further aspect, the invention further provides a use of the system according to the invention for an organ model system, especially a cartilage model system.

In a yet further aspect, the invention further provides a kit for performing the method according to the invention, the kit comprising the system according to the invention and the fluid material precursor.

The embodiments described herein are not limited to a single aspect of the invention. For example, an embodiment describing the device with respect to its functionalities further relates, for example, to the method for mechanical stimulation. Similarly, an embodiment of the manufacturing method describing an elastic material suitable for manufacturing the device may further apply to the device, i.e., it is clear that In embodiments, the device may have been manufactured from (and thus comprises) the elastic material.

The system may be part of or may be applied in a model system, especially a cellular model system, such as heart model system, a lung model system, a cartilage model system, a gut model system, an esophagus model system, a blood vessel model system, a (3D) cancer model system, a bone model system, or a liver model system. The system may be part of or may be applied in a model system, especially an organ-on-a-chip system.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE EMBODIMENTS

Figure 1A:
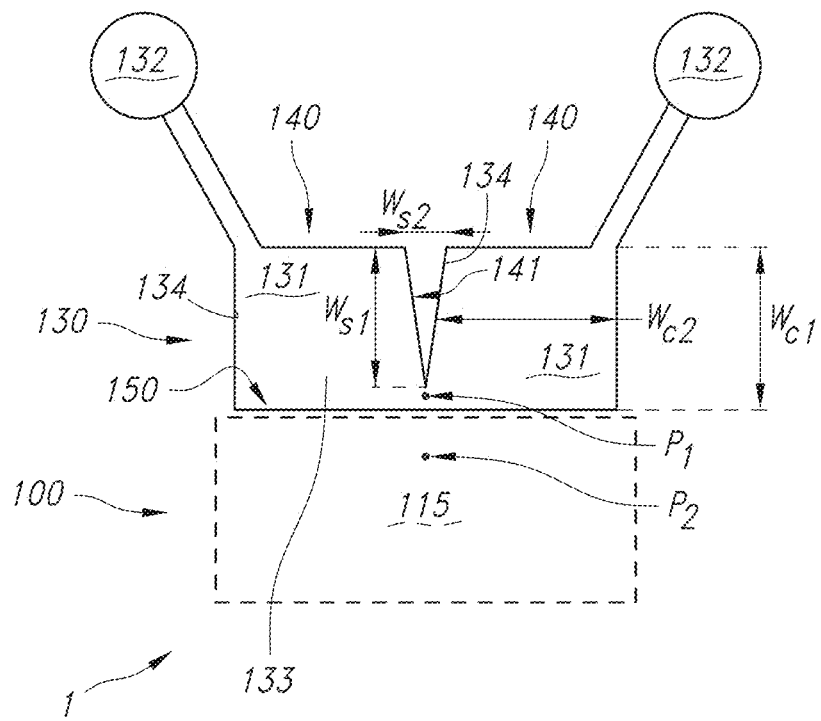
FIG. 1A-B schematically depict an embodiment of the microfluidic device.

FIG. 1A schematically depicts a system 1 comprising a microfluidic device 100 for providing a mechanical stimulation to a hosting space 115. The microfluidic device 100 comprises a pressure array 130, and an elastic membrane 150. The hosting space 115 may be configured for hosting a material 10. The membrane 150 is arranged between the pressure array 130 and the hosting space. The pressure array 130 comprises a plurality of pressure chambers 131 configured to independently provide a pressure to the membrane 150. The pressure array 130 comprises (a pressure set 140 comprising) two adjacent pressure chambers 131 sharing a chamber separator 141, wherein the membrane 150 is configurable at a plurality of distances $P_1, P_2$ from the chamber separator 141 based on pressures provided to the membrane 150 by the two adjacent pressure chambers 131. Especially, the membrane is configurable between a first configuration $P_1$ and a second configuration $P_2$ relative to the chamber separator 141 based on pressures provided to the membrane 150 by the two adjacent pressure chambers 131, i.e., the membrane may also be configured between the first configuration $P_1$ and the second configuration $P_2$. In further embodiments, the first configuration $P_1$ (of the membrane 150) provides a fluid separation of the two adjacent pressure chambers 131, and the second configuration $P_2$ provides a fluid connection between the two adjacent pressure chambers 131. Configurations in between may also provide a fluid connection.

In the depicted embodiment, the pressure chambers 131 are each in fluid connection to a respective pressure chamber reservoir 132. The system 1 may comprise or be functionally coupled to a pressure device configured for independently controlling the pressure in the plurality of pressure chambers 131. The pressure chamber reservoir 132 may be functionally coupled to the pressure device, especially a pressure device selected from the group comprising a pressure pump, a vacuum pump, and a combined pressure and vacuum pump. The pressure device may be configured to control the pressure of a fluid in the pressure chambers 131 (via the pressure chamber reservoirs 132). Dependent on the pressures of the two adjacent pressure chambers 131 (of the pressure set 140), the membrane 150 may move between a first configuration $P_1$ and a second configuration $P_2$ with respect to the chamber separator 141. Hence, the microfluidic device 100 may provide a mechanical stimulation to the hosting space 115 through changing the pressures of the pressure chambers 131.

In further embodiments, the chamber separator 141 may have a first chamber separator width $W_{S1}$, perpendicular to a second chamber separator width $W_{S2}$, selected from the range of 10-200 μm shorter than the pressure chamber width $W_{C1}$ of (one of) the two adjacent pressure chambers 131. Hence, with the membrane 150 in the neutral position (as depicted), the two adjacent pressure chambers 131 have a fluid connection along a space between the membrane 150 and the chamber separator 141 having a length equal to $W_{C1} - W_{S1}$, i.e., along a space having a length selected from the range of 10-200 μm.

FIG. 1A (and other drawings) also schematically depicts an embodiment wherein the length, indicated with reference $W_{c2}$ of the pressure chamber 131 may vary over the width, indicated with reference $W_{c1}$.

The pressure chamber 131 may be defined by a wall 134. The wall 134, or at least part thereof, may be configured as chamber separator 141 with an adjacent pressure chamber 131. The pressure chamber 131 may include at one side an opening that may be configured in fluid connection with the pressure chamber reservoir 132 and with a pressure device. Further, the pressure chamber 131 may at another side have a chamber opening 133 facing the membrane 150. Hence, the pressure chamber may in embodiments be defined by an enclosing wall 134 with two openings. These two openings may be configured at a distance about equal to a width of the pressure chamber.

Figure 1B:
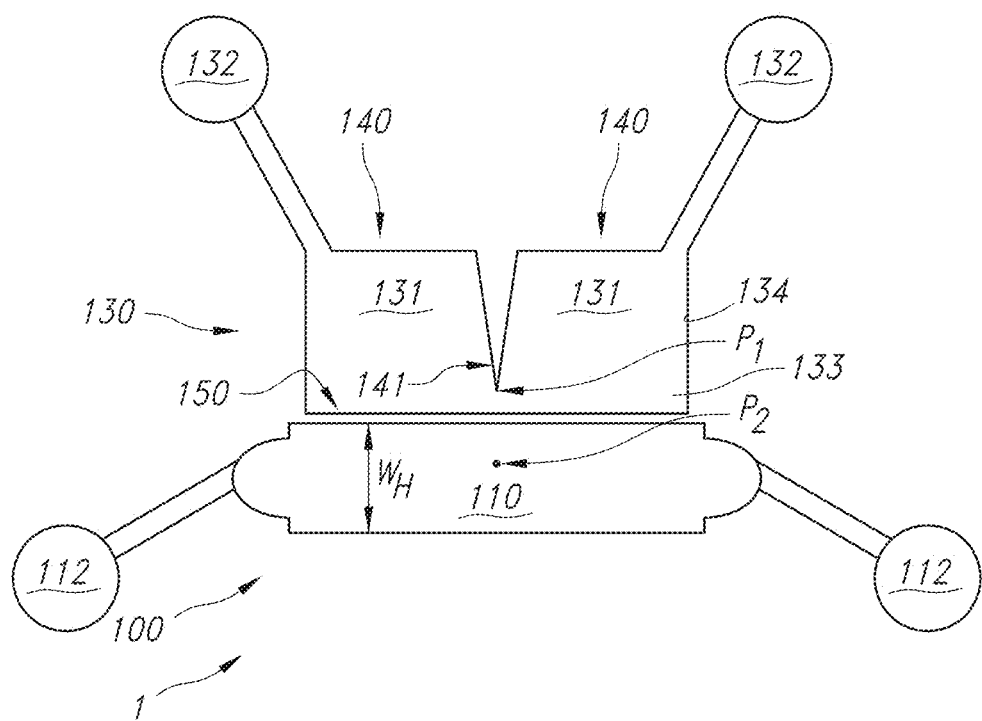

FIG. 1B schematically depicts a system 1 comprising a microfluidic device 100 for providing a mechanical stimulation to a material 10. The microfluidic device 100 comprises a hosting chamber 110, a pressure array 130, and an elastic membrane 150. The hosting chamber 110 is configured for hosting the material 10. The membrane 150 is arranged between the pressure array 130 and the hosting chamber 110. The pressure array 130 comprises a plurality of pressure chambers 131 configured to independently provide a pressure to the membrane 150. The pressure array 130 comprises (a pressure set 140 comprising) two adjacent pressure chambers 131 sharing a chamber separator 141, wherein the membrane 150 is configurable at a plurality of distances P1,P2 from the chamber separator 141 based on pressures provided to the membrane 150 by the two adjacent pressure chambers 131. Especially, the membrane is configurable between a first configuration P1, especially an abutment position, and a second configuration P2, especially a remote position, relative to the chamber separator 141 based on pressures provided to the membrane 150 by the two adjacent pressure chambers 131. In further embodiments, the first configuration (of the membrane 150) provides a fluid separation of the two adjacent pressure chambers 131, and the second configuration provides a fluid connection between the two adjacent pressure chambers 131. In this embodiment, the hosting chamber 110 has a width $W_H$ selected from the range of 500-3000 μm.

The material 10 may be provided to the hosting chamber 110 prior to or during operation of the microfluidic device 100. The material may comprise a solid, a liquid, and/or a gas, especially a combination thereof.

In the depicted embodiment, the hosting chamber 110 is in fluid connection to two hosting chamber reservoirs 112.

The term "thickness" used herein especially refers to the direction into the plane with regards to the depicted embodiments.

For example, in FIG. 1A, the pressure chambers 131 may approximately have a square (cross-sectional) shape, and may have a thickness $T_c$ (see FIG. 6) into the plane (perpendicular to the depiction), especially wherein the thickness $T_c$ is smaller than the other dimensions of the pressure chamber.

In embodiments, the hosting chamber 110 may have a hosting chamber width $W_{C1}$ perpendicular to the membrane 150 selected from the range of 500-3000 µm, and a length $W_{C2}$ perpendicular to $W_{C1}$ selected from the range of 500-3000 µm. The thickness Tc of the pressure chamber 131 is perpendicular to both $W_{C1}$ and $W_{C2}$.

The distance between the membrane 150 and the chamber separator 141 may especially be determined at a middle point with respect to the thickness of the chamber separator 141, especially with respect to the thickness of at least one of the two adjacent pressure chambers 131.

Figure 2A:
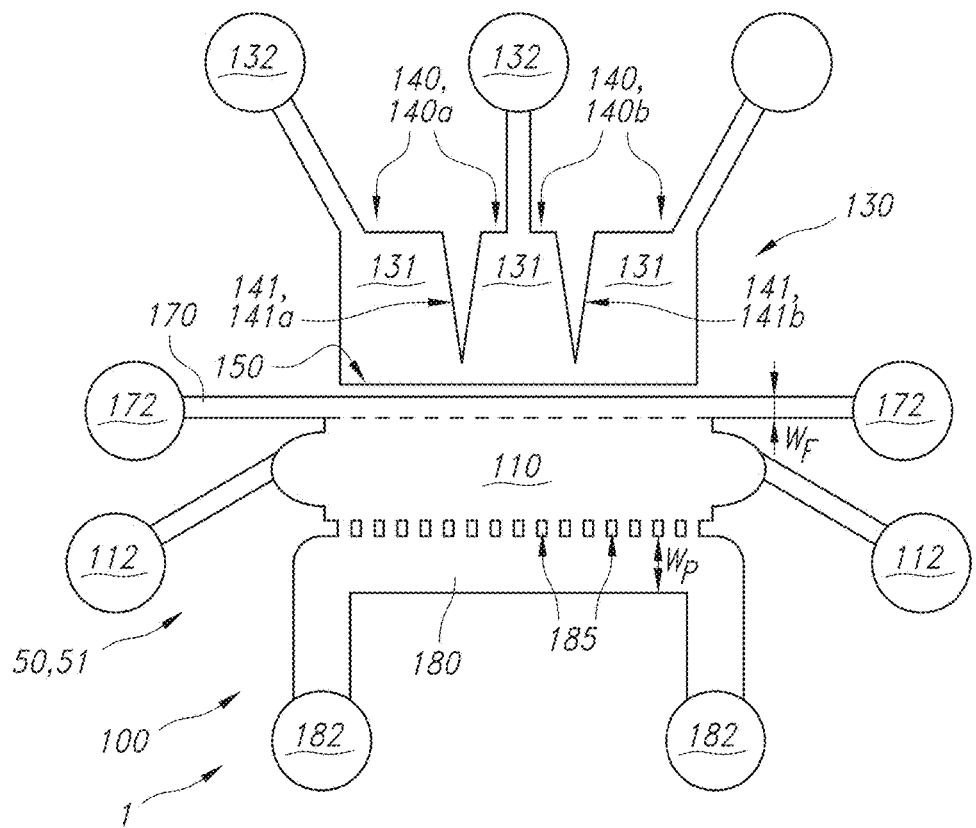
FIG. 2A-D schematically depict a further embodiment of the microfluidic device.

FIG. 2A schematically depicts a further embodiment of the microfluidic device 100, wherein the pressure array 130 comprises three pressure chambers 131. A first pressure set 140a comprises two adjacent pressure chambers 131 sharing a chamber separator 141a, and a second pressure set 140b comprises two adjacent pressure chambers 131 sharing a chamber separator 141b, wherein one of the pressure chambers 131 is comprised in both the first pressure set 140a and the second pressure set 140b.

In the depicted embodiment, the microfluidic device 100 further comprises a perfusion channel 180, wherein the perfusion channel 180 is arranged in fluid contact with the hosting chamber 110. The perfusion channel may, during operation, comprise a perfusion channel fluid. The perfusion channel fluid may, for example, comprise a first (soluble) compound diffusing into the hosting chamber 110, especially into the material 10 in the hosting chamber 110. For example, In further embodiments, the material 10 in the hosting chamber 110 comprises a hydrogel comprising a live cell, especially a plurality of live cells, and the first compound, such as a (bio-)chemical soluble compound, especially a nutrient or drug or differentiation factor, diffuses into the hydrogel from the perfusion fluid.

It will be clear to a person skilled in the art that the diffusion of the first (soluble) compound from the perfusion channel 180 into the (material 10 in the) hosting space 110 may result in a concentration gradient of the first (soluble) compound in the hosting space 110, especially wherein the concentration is highest near the perfusion channel 180. In further embodiments, the material 10 may be configured to (partially) consume the first (soluble) compound. For example, the first compound may react with the material 10 in the hosting chamber 110, or, in embodiments wherein the material 10 comprises a live cell and the first (soluble) compound comprises a nutrient, a drug or a differentiation factor for the live cell, the live cell may consume the first (soluble) compound.

The perfusion channel 180 may further be in fluid connection to a perfusion channel reservoir 182, especially two or more perfusion channel reservoirs 182, configured to provide a perfusion channel fluid to the perfusion channel 180 (during operation). Especially, In embodiments wherein the perfusion channel 180 is in fluid connection to two or more perfusion channel reservoirs 182, a fluid may be provided to one of the perfusion channel reservoirs 182 and may be withdrawn from another perfusion channel reservoir 182.

In the depicted embodiment, the microfluidic device 100 further comprises a porous barrier 185 arranged between the hosting chamber 110 and the perfusion channel 180. The porous barrier 185 is configured to allow the perfusion fluid to move through the porous barrier 185 (into the hosting chamber 110), especially primarily through diffusion, while preventing the material 10 arranged in the hosting chamber 110 to move through the porous barrier 185 (into the perfusion channel 180). The porous barrier 185 comprises, in the depicted embodiment, a row of solid pillars.

The porous barrier 185 may be configured to reduce, especially prevent, a direct shear stress on the material 10 due to the direct flow of the perfusion fluid, i.e., if the porous barrier 185 were absent, the lateral flow of the perfusion fluid past the material 10 in the hosting chamber 110 could provide a direct shear stress on the material 10.

The porous barrier 185 may be configured to provide a support for the material 10 in the hosting chamber 110, especially as a positive pressure is applied to the membrane 150 by one or more pressure chambers 131 during operation.

In the depicted embodiment, the microfluidic device 100 further comprises a first channel 170 arranged between the membrane 150 and the hosting chamber 110, wherein the first channel 170 is configured to host a first fluid. The first channel may be in fluid connection to the hosting chamber, especially the first fluid may be in fluid connection to the material in the hosting chamber. The first fluid may provide several functions, in particular with regards to a cellular model system, such as for example: (i) friction reduction (as a grease), (ii) shock adsorption (as a dilatant), (iii) supply of (bio-)chemicals, such as nutrients, and (iv) waste removal.

The first channel 170 may be in fluid connection to one or more, especially two, first channel reservoirs 172. The first channel reservoirs may be configured to provide a first fluid to the first channel 170 (during operation). Especially, in embodiments wherein the first channel 170 is in fluid connection to two or more first channel reservoirs 172, a first fluid may be provided to one of the first channel reservoirs 172 and may be withdrawn from another first channel reservoir 172.

In further embodiments, the first fluid may comprise a (viscous) liquid.

In further embodiments, the perfusion fluid may diffuse through the material 10 in the holding chamber 110 into the first channel 170, especially into the first fluid. In such embodiment, the perfusion fluid may be (partially) withdrawn through a first channel reservoir 172. Similarly, the first fluid may diffuse through the material 10 in the holding chamber 110 into the perfusion channel 180, especially into the perfusion fluid. In such further embodiment, the first fluid may be (partially) withdrawn through a perfusion channel reservoir 182.

In further embodiments, the microfluidic device 100 may be configured as an organ model system 50, especially a cartilage model system 52. In such embodiment, the first channel may simulate the synovial compartment, and may comprise a first fluid resembling a synovial fluid, especially a (viscous) liquid. The first fluid may especially be configured to reduce friction between the membrane 150 and the material 10 in the hosting chamber 110. The hosting space may simulate one or more layers of cartilage, wherein the material 10 comprises a hydrogel, wherein the hydrogel comprises a live cell, especially wherein the live cell 20 comprises a cell selected from the group consisting of chondrocytes and/or osteocytes. The porous barrier 185 may simulate bones arranged adjacently to the cartilage. The perfusion channel 180 may simulate blood vessels, and may be configured to supply nutrients to the hosting chamber 110 through diffusion.

In further embodiments, the organ model system 50, especially the cartilage model system 52, is configured as the simpler embodiment shown in FIG. 1B. The desired features of a model system depend not only on the modelled system but also on the application of the modelled system. The additional features depicted in FIG. 2A may be (independently) beneficial for an organ model system as will be clear to the person skilled in the art.

In embodiments, the first channel may have a first channel width $W_F$ selected from the range 10-300 µm. In further embodiments, the perfusion channel may have a perfusion channel width WP selected from the range of 200-1000 µm.

Figure 2B:
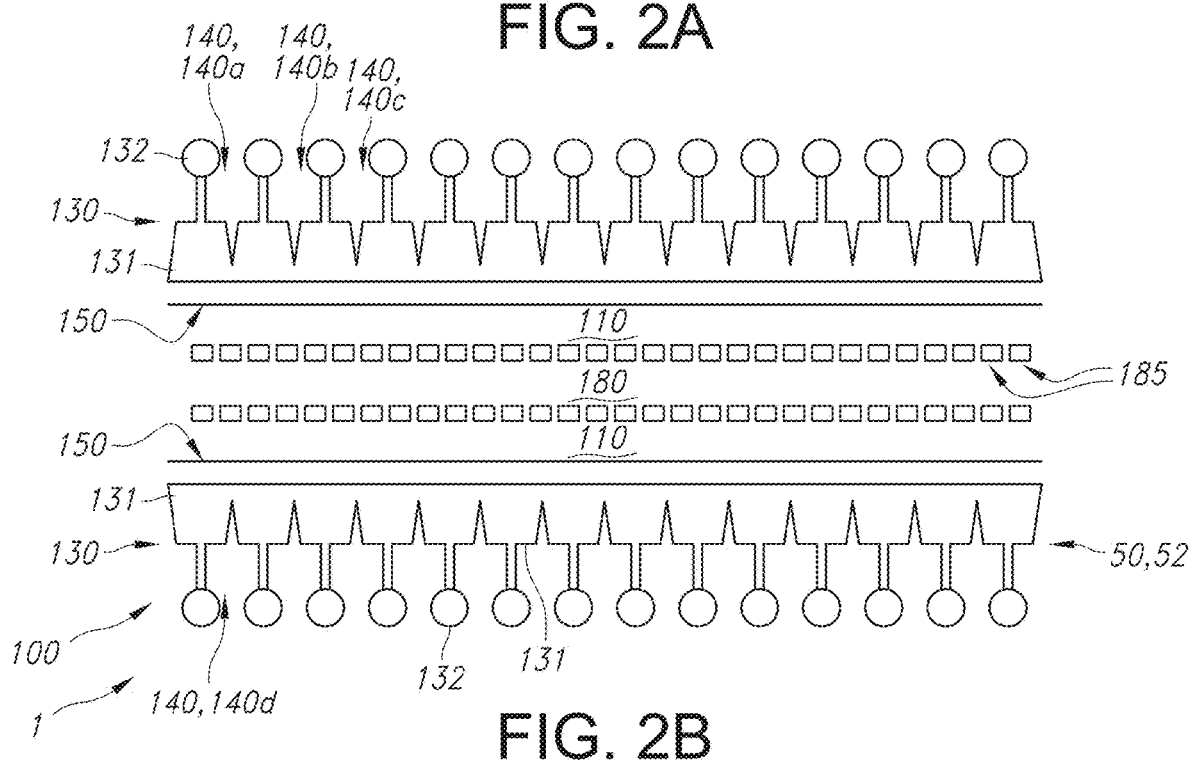

FIG. 2B schematically depicts a further embodiment of the microfluidic device 100, wherein the microfluidic device 100 comprises a plurality of pressure arrays 130, especially wherein the pressure arrays 130 are spatially separated. Specifically, the depicted microfluidic device 100 may comprise two pressure arrays 130, each comprising a plurality of pressure chambers 131 arranged in sequential pressure sets 140. In the depicted embodiment, a first pressure set 140a shares a pressure chamber 131 with a second pressure set 140b. The second pressure set 140b further shares a pressure chamber 131 with a third pressure set 140c. In further embodiments, each pressure chamber 131 forms a pressure set 140 with each adjacent pressure chamber 131.

In the depicted embodiment, the microfluidic device comprises two hosting chambers 110, each arranged with a respective membrane 150, a respective pressure set 130, and a respective porous barrier 185. The two hosting chambers are both in fluid connection to a shared perfusion channel 180 arranged between the two porous barriers 185.

In the depicted embodiment, a fourth pressure set 140d may be arranged opposite of the first pressure set 140a with respect to the holding chambers 110. Similarly, pressure sets may be arranged opposite of the second pressure set 140b and/or of the third pressure set 140c. In embodiments, the opposing pressure sets (or opposing pressure chambers) may be controlled in a coordinated manner. For example, opposing pressure sets (or opposing pressure chambers) may be configured to provide (substantially) identical pressures during operation. Alternatively, opposing sets may be configured to provide pressures of opposite sign during operation.

The embodiment of FIG. 2B may be configured as an organ model system 50, especially a gut model system 52. By sequentially providing a positive pressure along pressure chambers of the pressure arrays 130, the depicted system may, for example, simulate peristalsis (see further below).

Figure 2C:
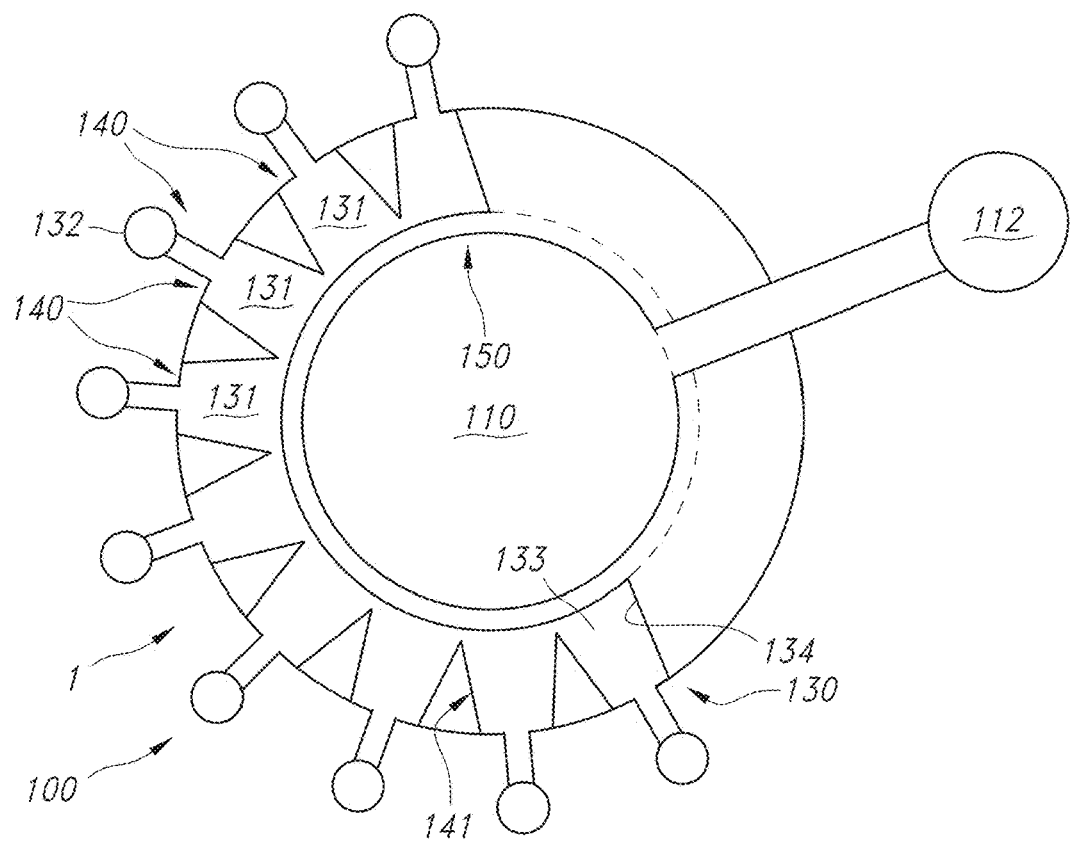

FIG. 2C schematically depicts a further embodiment of the microfluidic device 100, wherein the hosting chamber 110 approximates a circular shape, wherein the pressure array 130 comprises pressure chambers 131 arranged radially around the hosting chamber 110, wherein the membrane 150 is arranged between the hosting chamber 110 and the pressure chambers 131. It will be clear to the person skilled in the art that the shape of the hosting chamber may be adjusted to simulate specific (biological) features in a model system. For example, in further embodiments, the microfluidic device may be configured as a lung model system, especially wherein the hosting chamber approximates a (partial) circular shape.

In further embodiments, the pressure array 131 may comprise pressure chambers radially arranged substantially around the hosting chamber 110, i.e., the pressure chambers 131 may provide an (almost) full circle around the hosting chamber 110. In further embodiments, the hosting chamber reservoir 112 may be arranged within the hosting chamber. In yet further embodiments, the channel connecting the hosting chamber 110 and the hosting chamber reservoir 112 may be arranged below (or above) the pressure chambers 131, especially such that the pressure chambers 131 may be radially arranged around the entirety of the hosting chamber 110.

Figure 2D:
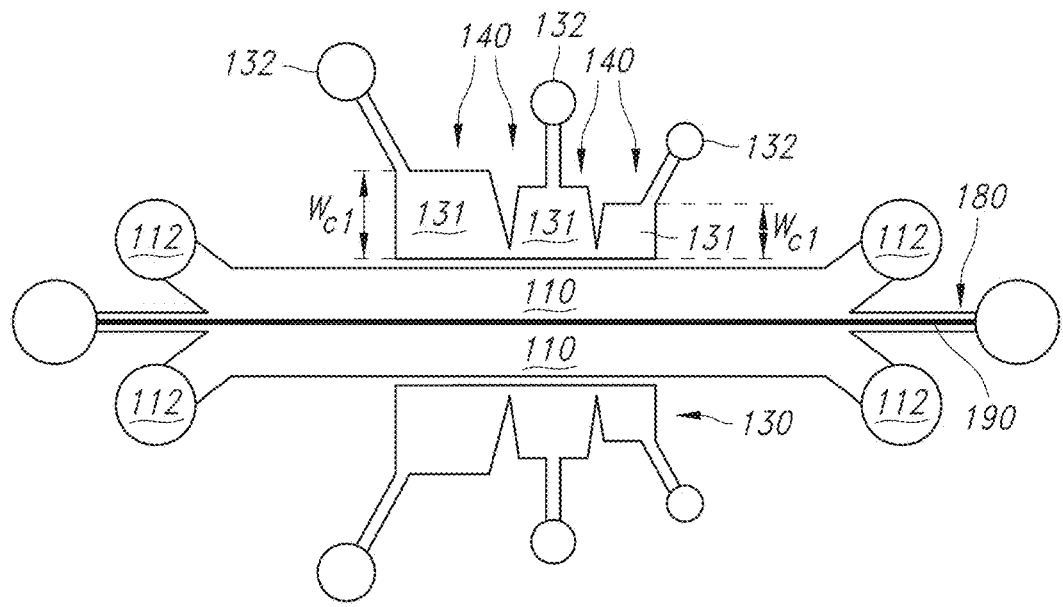

FIG. 2D schematically depicts a further embodiment of the microfluidic device 100, wherein the pressure array 130 comprises pressure chambers 131 having different shapes, especially sizes, such as widths $W_{C1}$. The depicted embodiment further comprises a moveable fiber 190 arranged in the perfusion channel 180. The moveable fiber 190 may be used to provide a fluidic separation between two spaces, especially between two chambers, such as the two holding chambers 110 in the depicted embodiment. In the embodiment, the moveable fiber 190 may facilitate providing a material 10 to one of the holding chambers 110, and providing a different material 10, especially the same material 10, to the other holding chamber 110 (see further below).

For example, an embodiment of the method for mechanically stimulating a material with the microfluidic device may comprise a material providing stage comprising providing a first fluid precursor material, especially a first liquid precursor material, to one of the hosting chambers 110, and providing a second fluid precursor material, especially a second liquid precursor material, to the other of the hosting chambers 110, and hardening the first fluid precursor material to form the material 10, and hardening the second fluid precursor material to form a different material 10, especially the same material 10. After the hardening, the material providing stage may further comprise removing the moveable fiber 190 from the perfusion channel 180, especially such that a perfusion fluid may be subsequently provided to the perfusion channel 180.

In the depicted embodiments, the pressure arrays are—for visualization purposes only—depicted as comprising a single row of pressure chambers, i.e., for example, 1×3 pressure chambers for the embodiment of FIG. 2A. However, the pressure arrays may comprise multiple rows of pressure chambers, such as, for example three rows of three pressure chambers each, resulting in a 3×3 grid of pressure chambers.

It will be clear to the person skilled in the art that many modifications of the structure of the microfluidic device may be possible within the scope of the invention.

FIG. 3A-D schematically depict an embodiment for mechanically stimulating a material 10 with a microfluidic device 100 according to the invention, wherein the material 10 is arranged in the hosting chamber 110, wherein the microfluidic device 100 comprises or is functionally coupled to a pressure device configured for independently controlling the pressure in the plurality of pressure chambers 131, wherein the method comprises:—a pressure stage comprising providing a pressure on the material 10 with at least part of the membrane 150, especially by providing a positive pressure to a pressure chamber, or especially by providing a negative pressure to a pressure chamber.

Figure 3A:
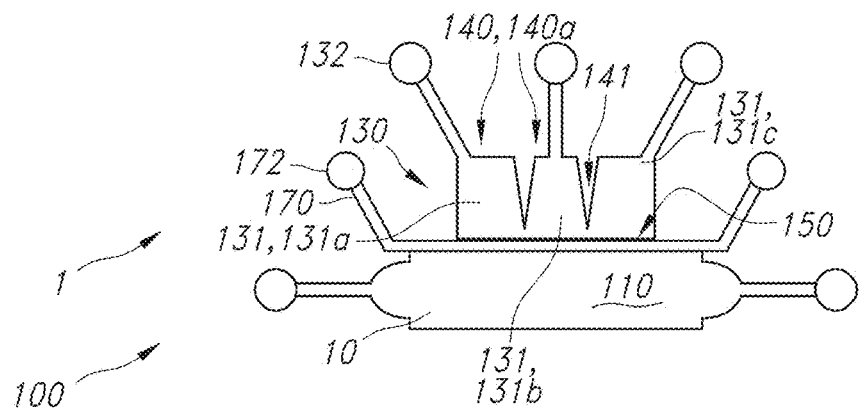
FIG. 3A-E schematically depict an embodiment for mechanically stimulating a material with a microfluidic device according to the invention.
Figure 3B:
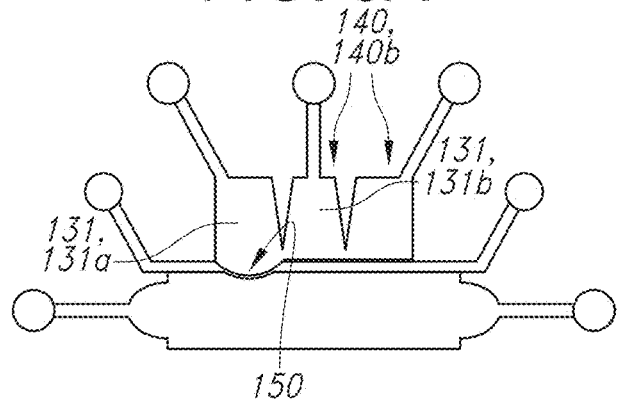
Figure 3C:
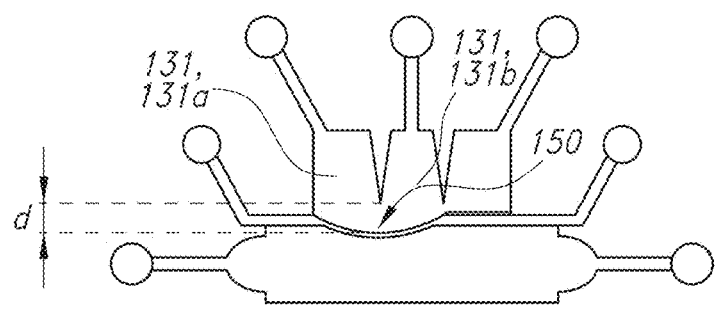
Figure 3D:
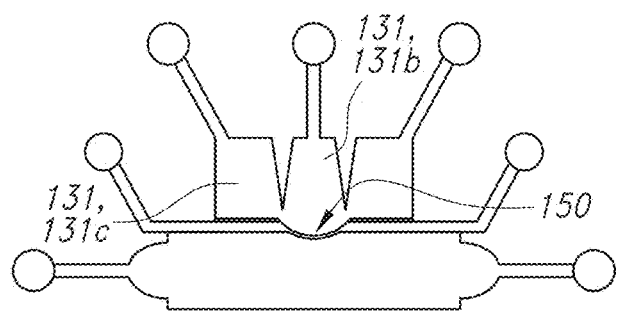

FIG. 3A schematically depicts the microfluidic device 100 wherein each of the pressure chambers 131,131a,131b,131c have a pressure (approximately) equal to the ambient pressure. FIG. 3B schematically depicts the first pressure chamber 131a having a positive pressure (relative to the ambient pressure). In FIG. 3B, the second pressure chamber 131b and the third pressure chamber. 3C may have a pressure (approximately) equal to the ambient pressure or may have a lower pressure. In FIG. 3C, both the first pressure chamber 131a and the second pressure chamber 131b have a positive pressure. In FIG. 3D, the second pressure chamber has a positive pressure. As can be clearly seen from FIG. 3A-D, the membrane 150 deforms as a function of the pressures provided by the pressure chambers. Specifically, the membrane 150 is depicted to deform to a convex shape with respect to a pressure chamber 131 providing a positive pressure, especially a single convex shape with respect to adjacent pressure chambers providing a positive pressure. Similarly, the membrane 150 may deform to a concave shape relative to a pressure chamber 131 providing a negative pressure.

FIG. 3A-D schematically depict an embodiment of the method over time. In the embodiment, the method for mechanically stimulating a material 10 comprises a pressure stage. The system may start in a resting stage, wherein each pressure chamber provides a similar pressure, especially approximately an ambient pressure (FIG. 3A). The pressure stage comprises the steps: (i) providing a positive (or negative) pressure on the membrane 150 with a first pressure chamber 131a of two adjacent pressure chambers (FIG. 3B), especially while providing a negative (positive) pressure on the membrane 150 with a second pressure chamber 131b of the two adjacent pressure chambers, (ii) providing a positive (negative) pressure on the membrane 150 with a second pressure chamber 131b of the two adjacent pressure chambers 140 (FIG. 3C); and (iii) releasing the positive (negative) pressure on the membrane 150 provided by the first pressure chamber 131a (FIG. 3D). Through the successive application of pressure to the material, the material may experience a shear stress. Further, the method may provide a moving pressure front to the material 10 by sequentially providing a positive (negative) pressure along a sequence of pressure chambers.

In further embodiments, steps (ii) and (iii) of the pressure stage may be temporally separated, i.e., after step (ii) the first pressure chamber 131a and the second pressure chamber 131b provide a shared pressure front to the material 10 (FIG. 3C) via the (convex) membrane prior to reducing the pressure of the first pressure chamber 131a. In further embodiments, steps (ii) and (iii) may occur simultaneously.

In further embodiments, the pressure stage comprises sequentially providing a positive (negative) pressure on the membrane 150 with adjacently arranged pressure chamber 131 to provide a pressure wave to the membrane 150 along the pressure chambers 131. For example, by successively applying steps (i)-(iii) of the pressure stage to pressure sets of the embodiment depicted in FIG. 2B, i.e., first to the first pressure set 140a, then to the second pressure set 140b, then to the third pressure set 140c, and so forth along the pressure sets 140 of the pressure stage 130.

FIG. 3C further depicts a range d comprising a plurality of distances between an abutment position and a remote position of the membrane 150 with respect to a chamber separator 141, wherein the membrane is configurable at the plurality of distances d.

Figure 3E:
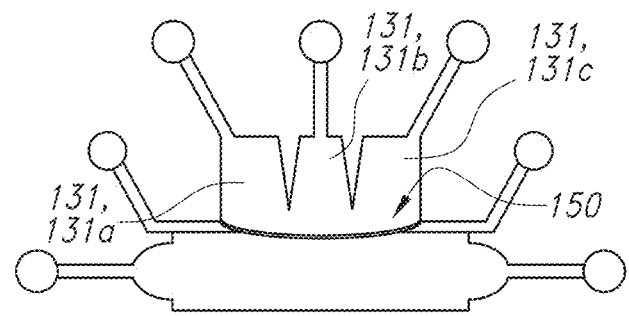

FIG. 3E schematically depicts an embodiment of the pressure stage, wherein the pressure stage further comprises providing a positive pressure on the membrane 150 with three adjacent pressure chambers 131 (two adjacent pressure sets 140 sharing a pressure chamber 131).

Similarly, in further embodiments, the pressure stage may comprise providing a positive pressure on the membrane 150 with four or more adjacent pressure chambers 131. In yet further embodiments, the pressure stage may comprise (repeatedly) providing a pressure pattern such as abc-Abc-ABc-ABC-aBC-abC-abc, or abcd-Abcd-ABcd-ABCd-aBCD-abCD-abcD-abcd, wherein "A" ("a") indicates a positive (negative) pressure in a first pressure chamber, "B" ("b") a positive (negative) pressure in a second pressure chamber, and "C" ("c") a positive (negative) pressure in a third pressure chamber, and "D" ("d") a positive (negative) pressure in a fourth pressure chamber.

Hence, referring to e.g. FIGS. 3c and 3d, adjacent pressure chamber may provide—during a time period during operation—essentially the same pressure to the membrane.

Figure 4A:
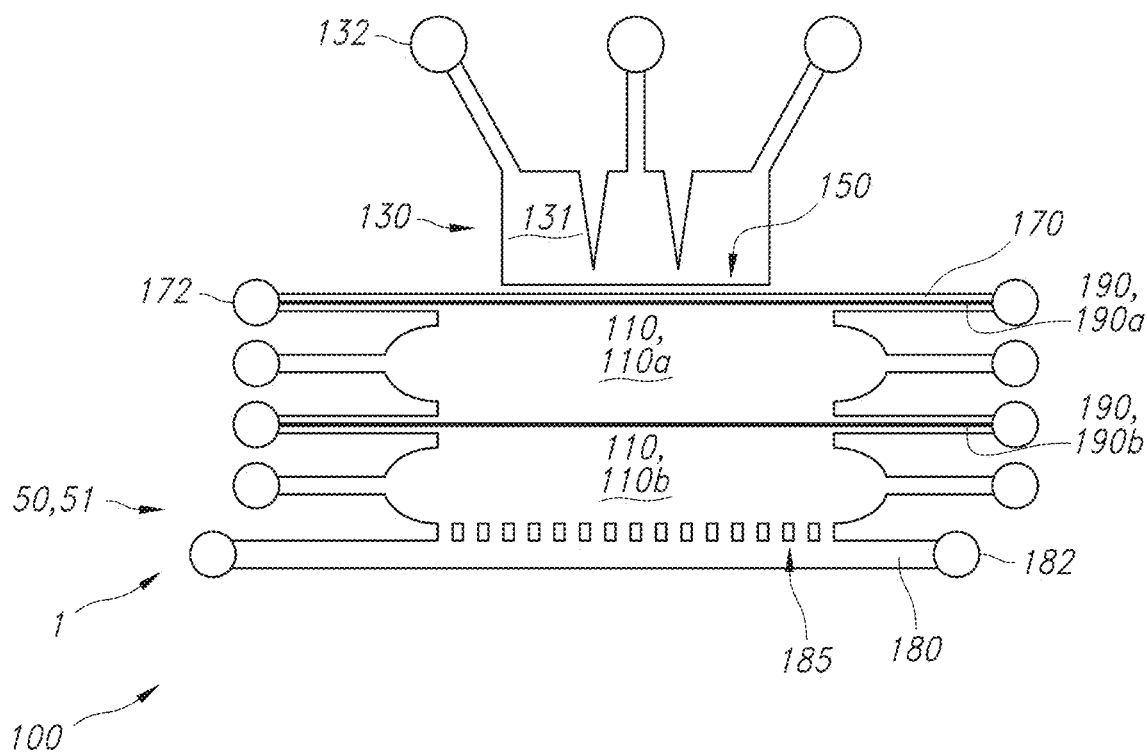
FIG. 4A-B schematically depict part of an embodiment of the method for manufacturing the system.
Figure 4B:
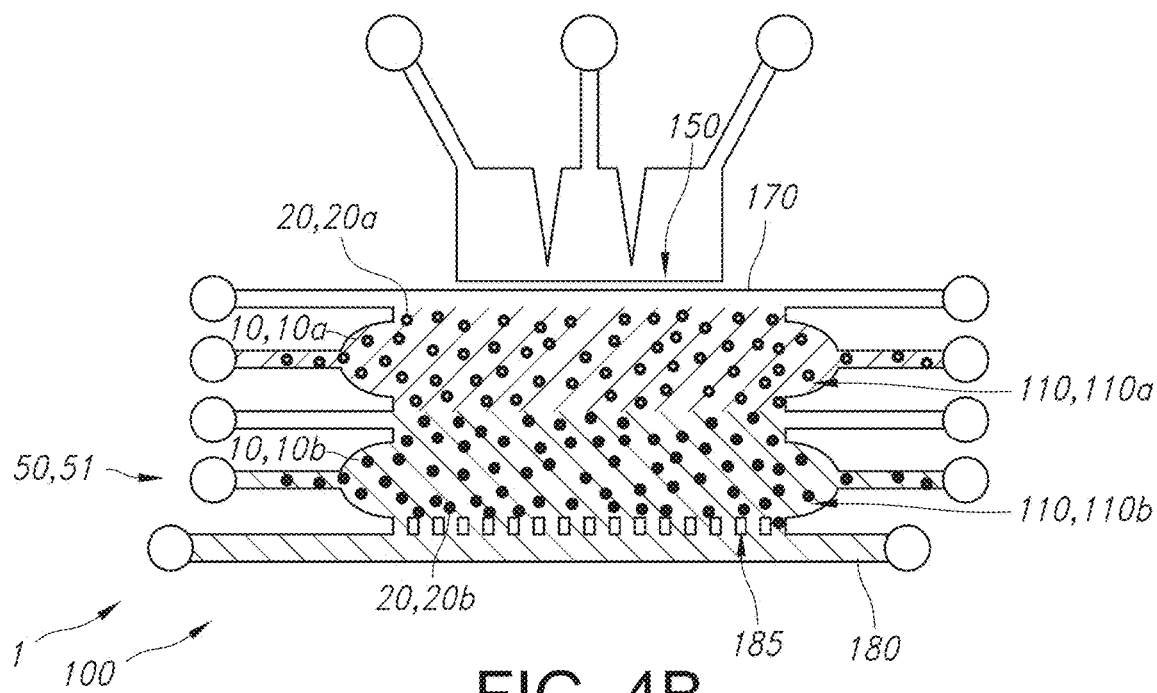

FIG. 4A-B schematically depict part of an embodiment of the method for manufacturing the system, specifically the material providing stage. FIG. 4A depicts the microfluidic device 100 prior to the material providing stage, whereas FIG. 4B depicts the microfluidic device 100 after the material providing stage.

The method for manufacturing the system 1 according to the invention may comprise:—a manufacturing stage comprising applying one or more of photolithography, deposition, 3D-printing, mechanical milling, laser ablation, 2-photon lithography, electro-deposition, wet etching, dry etching, bonding, injection molding, embossing and soft lithography, to provide the microfluidic device 100. In embodiments, the method may comprise providing the microfluidic device 100 from an elastic material. In further embodiments, the manufacturing stage may further comprise embedding a moveable fiber 190 (also: "actionable fiber") in the microfluidic device 100.

In embodiments, the method may further comprise: a material providing stage comprising providing a liquid precursor material 15 to the hosting chamber 110, and hardening the precursor material to form the material 10.

In FIG. 4a, the microfluidic device 100 comprises a first moveable fiber 190a arranged in the first channel, and comprises a second moveable fiber 190b arranged between a first hosting chamber 110a and a second hosting chamber 110b. By way of example, the embodiment schematically depicted in FIG. 4a comprises a plurality (here two) hosting chambers.

Especially, the material providing stage may now comprise providing a fluid precursor material to the first hosting chamber 110a, and simultaneously or later providing a different fluid precursor material, especially the same fluid precursor material, to the second hosting chamber. The material providing stage further comprises hardening the fluid precursor material (in the first hosting chamber and in the second hosting chamber) to form the material 10 in the first hosting chamber and in the second hosting chamber.

In further embodiments, the material providing stage may comprise first providing a fluid precursor material to the first (second) hosting chamber 110a and hardening the fluid precursor material in the first (second) hosting chamber 110a, and then providing a (different) fluid precursor material to the second (first) hosting chamber 110b and hardening the fluid precursor material in the second (first) hosting chamber 110b. In further embodiments, the material providing stage may further comprise removing the first moveable fiber 190a. The material providing stage may further comprise removing the second moveable fiber 190b. Especially, the material providing stage may comprise removing the first moveable fiber 190a and/or the second moveable fiber 190b after hardening the fluid precursor material in the first (second) hosting chamber 110a, but before providing the fluid precursor material to the second (first) hosting chamber 110b. Hence, the method for manufacturing the device may facilitate providing multiple material layers, especially material layers comprising different materials, with respect to the membrane 150.

FIG. 4B depicts the microfluidic device 100 of FIG. 4A after the material providing stage. The first holding chamber comprises a first material 10a and the second holding chamber comprises a second material 10b. In the depicted embodiment, the second moveable fiber 190*b* (see FIG. 4A) was removed prior to providing the fluid precursor material to the second hosting chamber. In further embodiments, wherein the second moveable fiber 190*b* was only removed after hardening the second hosting chamber, a second fluid channel may be provided between the first hosting chamber 110*a* and the second hosting chamber 110*b*. In further embodiments, the first material and the second material may (both) comprise a live cell 20. Especially, the first material 10*a* may comprise a first live cell 20*a*, and/or the second material 10*b* may comprise a second live cell 20*b*. In further embodiments, the (manufactured) microfluidic device comprises an organ model system 50, especially a cartilage model system 51. Especially, the first live cell 20*a* and the second live cell 20*b* comprise different cell types spatially separated in the modeled organ, such as chondrocytes and/or osteocytes for a cartilage model system.

Figure 5:
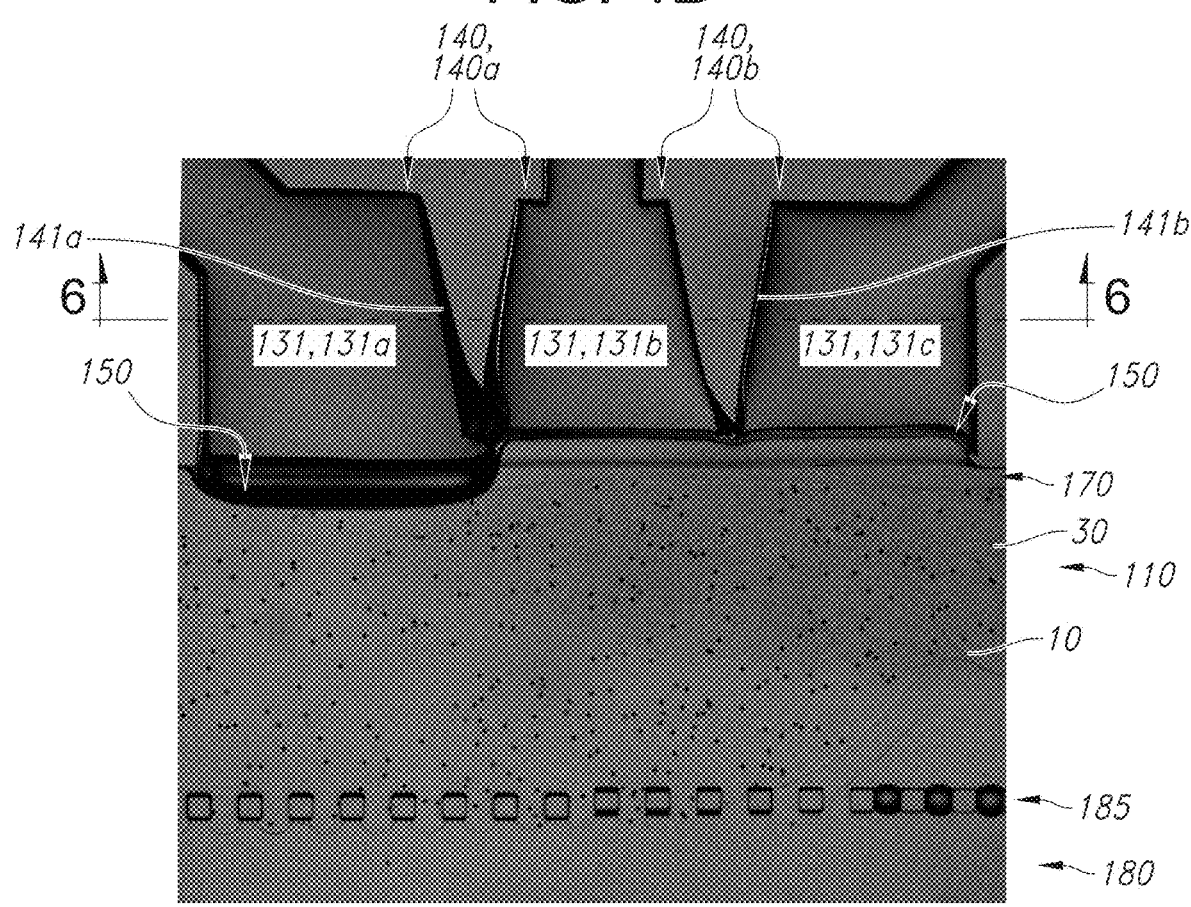
FIG. 5 schematically depicts a picture of an embodiment of the microfluidic device during operation.

FIG. 5 schematically depicts a picture of an embodiment of the microfluidic device 100 during operation. Especially, the image depicts a picture of the embodiment of FIG. 2A. In the picture, a first pressure chamber 131*a* provides a positive (gauge) pressure to the membrane 150, while a second pressure chamber 131*b* and third pressure chamber 131*c* both provide a negative pressure to the membrane 150. The picture clearly shows the deformation of the membrane 150 dependent on the pressures provided by the pressure chambers 131. The pressure of the first pressure chamber 131*a* causes the membrane 150 to deform into a convex shape (with respect to the first pressure chamber 131) which may provide a mechanical stimulus to the material 10 in the hosting chamber 110. The pressure of the second pressure chamber 131*b* causes the membrane 150 to deform into a concave shape (with respect to the second pressure chamber 131*b*), which may provide a mechanical stimulus to the material 10 in the hosting chamber 110.

The depicted embodiment further shows a first pressure set 140*a* comprising the first pressure chamber 131*a* and the second pressure chamber 131*b* separated by a first chamber separator 141*a*. Dependent on the relative pressures acting on the membrane 150, the membrane 150 may be in an abutment position relative to the first chamber separator 141*a*, resulting in a fluid separation between the first pressure chamber and the second pressure chamber, or may be distanced from the first chamber separator 141*a*, resulting in a fluid connection between the first pressure chamber and the second pressure chamber.

The depicted embodiment further shows the membrane in an abutment position relative to the second chamber separator 141*b* of the second pressure set 141*b*.

In the depicted embodiment, the material 10 comprises a hydrogel comprising beads 30. The micrometer-sized beads may enable visually tracking the displacement of the material 10 as a function of the mechanical stimulation provided to the material 10.

FIG. 5 also schematically depicts an embodiment wherein the length of the pressure chamber 131 may vary over the width. The hyphened line indicates the location of the schematic cross-sectional view of FIG. 6.

FIGS. 1A-5 schematically depict embodiments wherein the membrane in a neutral position (the chambers having a pressure equal to the ambient air pressure) is not in physical contact with the chamber separator. However, in other embodiments (not schematically depicted), the membrane in a neutral position is in physical contact with the chamber separator. In both types of embodiments, the first configuration $P_1$ may essentially be the tip of the chamber separator; in the former embodiments, however, a negative pressure may then have to be applied. FIGS. 1A-5 schematically depict embodiments wherein the chamber separator has a schematically depicted sharp tip. However, the tip may also be blunt, or flat, etc.

Figure 6:
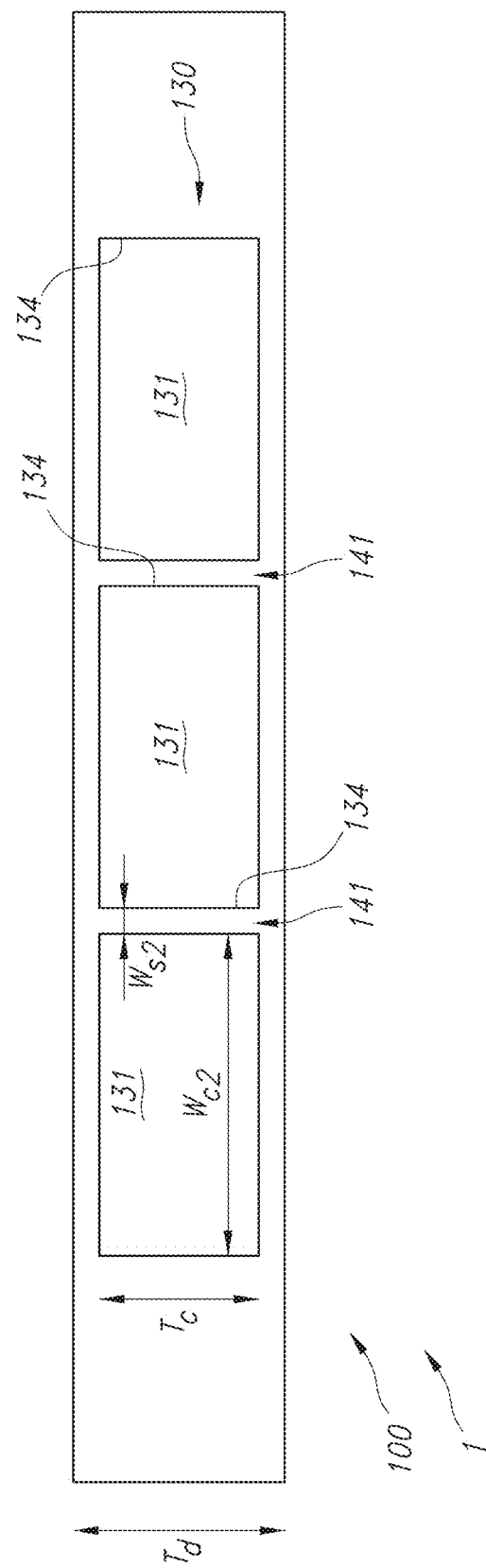
FIG. 6 schematically depicts a cross-sectional side-view of an embodiment of the microfluidic device. The schematic drawings are not necessarily on scale.

FIG. 6 schematically depicts a cross-sectional side-view of the microfluidic device 100. In the depicted embodiment, the chamber thickness $T_c$ of the pressure chamber 131 may be close to the device thickness $T_d$, such as about 90% of the device thickness $T_d$. In further embodiments, the thickness $T_c$ of the pressure chamber may be substantially smaller than the device thickness $T_d$, such as in embodiments wherein a pressure array 130 comprises multiple rows of pressure chambers 131 arranged along a height dimension of the microfluidic device 100.

FIGS. 5 and 6 also schematically depict embodiments of a "lateral system". A lateral system may be a system, especially here comprising a plate-like microfluidic device, wherein the pressure chambers and hosting chamber are configured next to each other and not on top of each other.

The terms "fluid connection", "fluid separation" and similar terms used herein will be understood by the person skilled in the art. The term "fluid connection" especially implies that a fluid can flow. The term "fluid separation" indicates the absence of a fluid connection. The term "fluid connection" may refer to a permanent or temporary fluid connection.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" includes also embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may In embodiments refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The term "further embodiment" may refer to an embodiment comprising the features of the previously discussed embodiment, but may also refer to an alternative embodiment.

The devices, apparatus, or systems may herein amongst others be described during operation. As will be clear to the person skilled in the art, the invention is not limited to methods of operation, or devices, apparatus, or systems in operation. The term "controls" and similar terms herein especially relates to a device, apparatus, or system during operation, especially during a controlling mode. Hence, a phrase such as "configured for controlling" especially refers to "configured for controlling in a controlling mode". The device, apparatus, or system may also be operated in a non-controlling mode. The device, apparatus, or system may further be operated in two or more different controlling modes, especially wherein the controlling modes are temporally separated.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A system comprising a microfluidic device for providing a mechanical stimulation to a material, the microfluidic device comprising a hosting chamber, a pressure array, and an elastic membrane, wherein the hosting chamber is configured for hosting the material, wherein the membrane is arranged between the pressure array and the hosting chamber, wherein the pressure array comprises a plurality of pressure chambers configured to independently provide a pressure to the membrane, wherein the pressure array comprises two adjacent pressure chambers sharing a chamber separator, wherein the membrane is configurable at a plurality of distances from the chamber separator based on pressures provided to the membrane by the two adjacent pressure chambers, wherein the membrane is configurable between a first configuration and a second configuration relative to the chamber separator based on pressures provided to the membrane by the two adjacent pressure chambers, wherein the first configuration does not provide a fluid connection between the two adjacent pressure chambers between the membrane and the chamber separator, and wherein the second configuration provides a fluid connection between the two adjacent pressure chambers between the membrane and the chamber separator.

2. The system according to claim 1, wherein the material comprises one or more of a solid, a liquid, and a gas.

3. The system according to claim 1, wherein the microfluidic device further comprises a perfusion channel, wherein the perfusion channel is arranged in fluid contact with the hosting chamber, wherein the microfluidic device further comprises a porous barrier arranged between the hosting chamber and the perfusion channel.

4. The system according to claim 1, wherein the pressure array comprises pressure chambers having different shapes.

5. The system according to claim 1, wherein the microfluidic device comprises a plurality of pressure arrays.

6. The system according to claim 1, wherein the system comprises or is functionally coupled to a pressure device configured for independently controlling the pressure in the plurality of pressure chambers.

7. The system according to claim 1, wherein the microfluidic device further comprises a first channel arranged between the membrane and the hosting chamber, wherein the first channel is configured to host a first fluid, and wherein the first channel is in fluid connection with the hosting chamber.

8. A method comprising providing a mechanical stimulation to a material with a system, including a microfluidic device having a hosting chamber, a pressure array, and an elastic membrane, wherein the hosting chamber is configured for hosting the material, wherein the membrane is arranged between the pressure array and the hosting chamber, wherein the pressure array comprises a plurality of pressure chambers configured to independently provide a pressure to the membrane, wherein the pressure array comprises two adjacent pressure chambers sharing a chamber separator, wherein the membrane is configurable at a plurality of distances from the chamber separator based on pressures provided to the membrane by the two adjacent pressure chambers, wherein the membrane is configurable between a first configuration and a second configuration relative to the chamber separator based on pressures provided to the membrane by the two adjacent pressure chambers, wherein the first configuration does not provide a fluid connection between the two adjacent pressure chambers between the membrane and the chamber separator, and wherein the second configuration provides a fluid connection between the two adjacent pressure chambers between the membrane and the chamber separator, wherein the material is provided in the hosting chamber, wherein the microfluidic device comprises or is functionally coupled to a pressure device configured for independently controlling the pressures in the plurality of pressure chambers, wherein the method further comprises providing a pressure on the material with at least part of the membrane.

9. The method according to claim 8, wherein providing the pressure on the material with at least part of the membrane comprises the steps: (i) providing a pressure on the membrane with a first pressure chamber of the two adjacent pressure chambers, (ii) providing a positive pressure on the membrane with a second pressure chamber of the two adjacent pressure chambers; and (iii) releasing the pressure on the membrane provided by the first pressure chamber, wherein providing the pressure comprises sequentially providing a pressure on the membrane with adjacently arranged pressure chambers to provide a pressure wave to the membrane along the pressure chambers.

10. The method according to claim 8, wherein the material comprises a hydrogel, wherein the hydrogel comprises a live cell.

* * * * *